United States Patent [19]

Mashige et al.

[11] Patent Number: 5,604,549
[45] Date of Patent: Feb. 18, 1997

[54] PRESS-MOLDED OPTICAL ELEMENT

[75] Inventors: Masashi Mashige; Masaki Omori, both of Kawasaki; Masayuki Tomida, Yokohama; Takeshi Nomura, Tokyo; Kiyoshi Yamamoto, Yokohama, all of Japan

[73] Assignee: Canon Kabushiki Kaisha, Tokyo, Japan

[21] Appl. No.: 373,439

[22] Filed: Jan. 17, 1995

Related U.S. Application Data

[62] Division of Ser. No. 69,381, Jun. 1, 1993, Pat. No. 5,435,818.

[30]     Foreign Application Priority Data

Jun. 2, 1992   [JP]   Japan   ................................. 4-165532
Jun. 30, 1992  [JP]   Japan   ................................. 4-172277
Apr. 23, 1993  [JP]   Japan   ................................. 5-098152
Apr. 27, 1993  [JP]   Japan   ................................. 5-122081

[51] Int. Cl.$^6$ ........................... G02C 7/02; G02B 3/00
[52] U.S. Cl. ................................ 351/177; 359/642
[58] Field of Search ......................... 359/642; 351/177

[56]              References Cited

U.S. PATENT DOCUMENTS

| | | | |
|---|---|---|---|
| 4,447,372 | 5/1984 | Kreuttner | 264/2.2 |
| 4,469,413 | 9/1984 | Shirayanagi | 350/432 |
| 4,534,614 | 8/1985 | Silverglate | 350/1.4 |
| 4,609,262 | 9/1986 | Fujikawa et al. | 350/432 |
| 4,891,053 | 1/1990 | Bartman et al. | 359/642 |
| 5,148,322 | 9/1992 | Aoyama et al. | 359/708 |
| 5,160,362 | 11/1992 | Yamamoto et al. | 65/102 |
| 5,161,061 | 11/1992 | Ihara et al. | 359/708 |
| 5,191,366 | 3/1993 | Kashiwagi | 351/177 |
| 5,215,566 | 6/1993 | Yamamoto et al. | 65/29 |
| 5,228,894 | 7/1993 | Sato et al. | 65/102 |
| 5,329,406 | 7/1994 | Nakanishi et al. | 359/642 |
| 5,361,168 | 11/1994 | Arai et al. | 359/642 |
| 5,435,818 | 7/1995 | Mashige et al. . | |

*Primary Examiner*—Scott J. Sugarman
*Assistant Examiner*—Jordan Schwartz
*Attorney, Agent, or Firm*—Fitzpatrick, Cella, Harper & Scinto

[57]               ABSTRACT

A method of molding an optical element numerically analyzes the thermal stress produced on a molded optical element product within a mold in a visco-elastic temperature range or elastic temperature range of an optical element material in a cooling step of the molding process on the basis of a visco-elastic characteristic of the optical element material. A correction for the molding face of the mold is made on the basis of the value obtained by the numerical analysis so that any error between the optical functional face of optical element molded by the mold at room temperature and the optical functional face set on design may fall within a tolerance, thereby determining the molding face adapted to the shape of the optical functional face set on design.

1 Claim, 22 Drawing Sheets

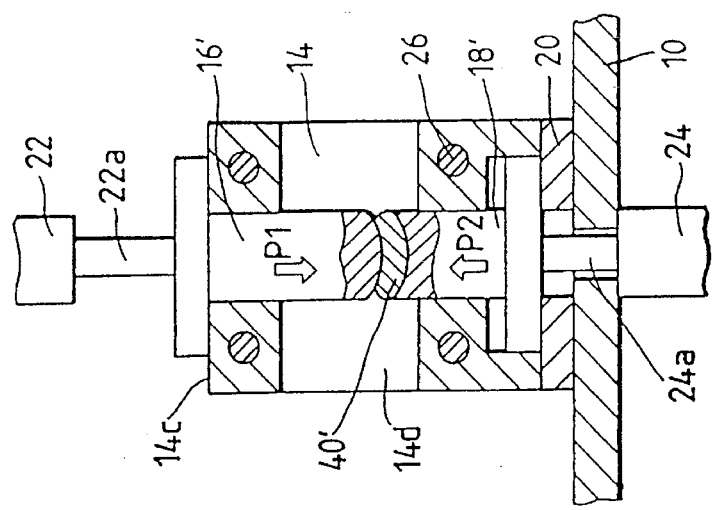
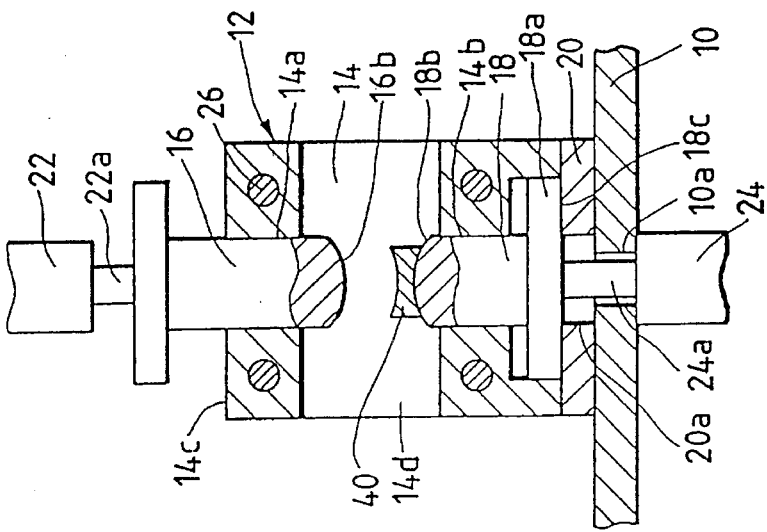
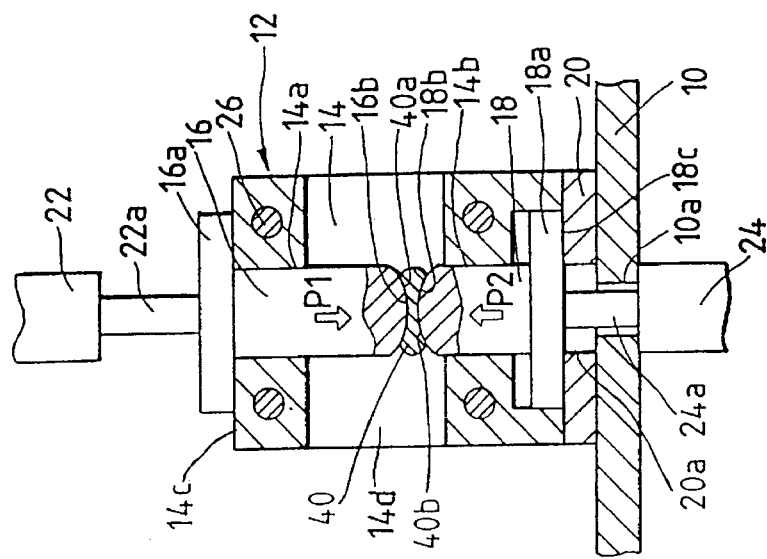

UPPER MOLD / LOWER MOLD
MOLDING FACE OF MOLD (CONVEX FACE)

UPPER PLANE / LOWER PLANE
OPTICAL FUNCTIONAL FACE OF OPTICAL ELEMENT (CONCAVE LENS)

UPPER MOLD / LOWER MOLD
MOLDING FACE OF CORRECTED MOLD (CONVEX FACE)

UPPER PLANE / LOWER PLANE
OPTICAL FUNCTIONAL FACE OF OPTICAL ELEMENT (CONCAVE LENS)

FIG. 12

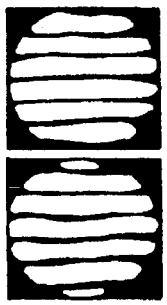

UPPER MOLD
(CONVEX FACE)

LOWER MOLD
(CONCAVE FACE)

MOLDING FACE
OF MOLD

UPPER PLANE
(CONCAVE FACE)

LOWER PLANE
(CONVEX FACE)

OPTICAL FUNCTIONAL
FACE OF OPTICAL
ELEMENT
(MENISCUS LENS)

FIG. 13

UPPER MOLD
(CONVEX FACE)

LOWER MOLD
(CONCAVE FACE)

MOLDING FACE OF
CORRECTED MOLD

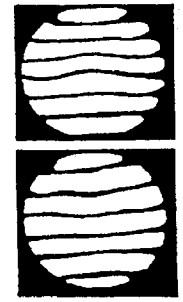

UPPER PLANE
(CONCAVE FACE)

LOWER PLANE
(CONVEX FACE)

OPTICAL FUNCTIONAL
FACE OF OPTICAL
ELEMENT
(MENISCUS LENS)

PRESS-MOLDED OPTICAL ELEMENT

This application is a division of application Ser. No. 08/069,381, filed Jun. 1, 1993 now U.S. Pat. No. 5,435,818.

BACKGROUND OF THE INVENTION

1. Field of the Invention

The present invention relates to a method for molding an optical element in which the optical element having a complex face shape such as an aspherical lens is press-molded at high precision.

2. Related Background Art

Recently, as optical instruments become smaller and lighter, it is desired to reduce the number of glass lenses for use in the optical system. One means for realizing this includes using an aspherical lens capable of correcting aberration even if the number of lenses is reduced. A method of producing such a lens having an aspherical shape is well known, in which glass material is sandwiched between the mold members having a predetermined surface precision and then is press molded.

A conventional method for molding an optical element by press molding has been disclosed in Japanese Patent Publication No. 61-32263. This method is such that glass material is sandwiched between a pair of mold members having a molding face finished to a face shape precisely corresponding to an ideal form of a completed shape of an optical element, and is press-molded in a range of temperatures at which the viscosity of glass material is from $10^8$ to $5\times10^{10}$ poise. Thereafter, the cooling is effected so that the temperature difference of the glass material and the mold members may not exceed at least 20° C., and a molded optical element is taken out from the mold members in a range of temperatures at which the viscosity of glass material is less than $10^{12}$ poise. With such a method, it is possible to produce high precision optical elements.

In the above conventional example, however, when producing an optical element of a shape whose surface accuracy is hardly obtained, such as a concave lens having a large radius of curvature of the surface or a meniscus lens, it often occurs that required surface accuracy (e.g., a high accuracy value such as less than one-fourth (¼) line of Newton ring) can not be satisfied even though various molding conditions are set to be optimum.

In order to improve the surface accuracy of a completed optical element even in a minor way, the pressing force is necessary to be strictly controlled in the cooling step after molding, for example, but it is quite difficult to control the pressing pressure strictly. Also, any slight change in the other molding conditions will decrease the surface accuracy. Furthermore, to improve the surface accuracy of an optical element, an auxiliary device may be often needed, so that there arises a problem that the cost of a processing apparatus is increased, thus giving rise to the higher cost of the optical element itself.

SUMMARY OF THE INVENTION

Accordingly, the present invention has been achieved in the view of the aforementioned problem, and its object is to provide a method for molding an optical element, capable of producing the optical element having a high surface accuracy without strictly controlling the molding conditions and preparing for any auxiliary device.

In order to solve the aforementioned problem and accomplish the above object, there is provided a molding method for an optical element, according to the present invention, in which a glass material rendered in a softened state by heating is pressed using a pair of mold members, and an optical functional face which surface shape of a molding face on the mold members is transferred, is formed on the surface of the glass material, comprising, in molding a plurality of optical elements, a first step of setting the molding condition such that a certain contour map of the surface can be stably formed on the optical functional face of each optical element, and a second step of molding the optical elements using the mold members worked into such a shape that the surface shape of the molding face cancels the certain contour map of the surface.

Also, the molding method for an optical element according to this invention is characterized in that the molding conditions are defined by the temperature difference of the one pair of mold members, the cooling rate, the pressure applied to the glass material in the cooling step, and the releasing temperature.

Also, there is provided a molding method for an optical element, according to the present invention, in which a glass material rendered in a softened state by heating is pressed using a pair of mold members, and an optical functional face to which surface shape of a molding face on the mold members is transferred, is formed on the surface of the glass material, comprising a first molding step of molding the glass material using primary mold members having a molding face shape corresponding to the surface shape of an optical element of a predetermined shape, based on the molding conditions such as predetermined heating temperature, mold member temperature, pressing force, pressing time and cooling rate, a measurement process of measuring the surface shape of optical element molded in the first molding step, a calculation step of calculating the error between measurement data obtained in the measurement process and final desired shape data of the optical element, a correction working step of working secondary mold members by correcting the molding face of the primary mold members based on a result obtained in the calculation process, and a second molding step of press molding the glass material under the same molding conditions as in the first molding step.

Also, the molding method for an optical element according to this invention is characterized in that the difference between measurement data obtained in the measurement process and the final desired shape data is at least equal to or less than 0.2 line of Newton ring.

Also, the molding method for an optical element according to this invention is characterized in that among the molding conditions, the temperature difference of the one pair of mold members is 0°±2.5° C., the cooling rate is 20°±5° C./min, and the pressure in cooling is set at 5±1.5 kN.

Also, the molding method for an optical element according to this invention is characterized in that the optical element is an aspherical lens.

It is a second object of the present invention to produce a mold in consideration of the visco-elastic characteristic of glass material.

A thermal stress is produced in the cooling step due to a difference between thermal expansion coefficient of glass material within the mold and that of the mold, and may cause a deformation in the molded optical element after opening of the mold. In particular, when the optical element to be molded is a concave lens on both faces or a concave meniscus lens, the molding face of the mold can-not be transferred to the glass material precisely, giving rise to a contour map of the surface on the optical functional face. The bad effect is remarkable when the ratio of lens central thickness to lens outer peripheral thickness is large.

The present invention has been achieved in the light of the above problem, and aims to provide a mold and a producing method thereof, wherein taking into consideration that in a cooling step regarding from press molding temperature to releasing temperature, the glass material exhibits remarkable visco-elastic characteristic in a range of temperatures at which the viscosity of glass material lies from $10^{12}$ to $10^{15}$ poise, exerting great effect on the thermal stress, numerical analysis is conducted, and the molding face is determined on the basis of numerical analysis so that the optical functional face of a molded optical element may be adapted to an optical functional face set on design.

Therefore, in the mold and the producing method thereof according to the present invention, when press molding the optical element material using the mold, the thermal stress produced in an optical element molded product within the mold in a visco-elastic temperature range or elastic temperature range of the optical element material in the cooling step of the molding process to be performed is numerically analyzed based on a visco-elastic characteristic of the optical element material. The molding face of the mold is corrected based on the value obtained by the numerical analysis so that any error between an optical functional face of the optical element molded by the mold at room temperature and an optical functional face set on a design may fall within a tolerance level, thereby determining the molding face to be adapted to a shape of the optical functional face set on design.

In this case, for the numerical analysis of the thermal stress, the history of temperature and/or pressing force upon the thermal stress being produced, may be added to the calculation basis. Also, it is preferable for the molding face to have its correction value determined based on the value obtained by the numerical analysis by means of computer simulation over several order. Also, the molding face may be determined in such a manner as to mold an optical element molded product, using practically a mold having the molding face corrected on the value obtained by the numerical analysis, and to correct it repeatedly over several order until the error between the optical functional face of the optical element molded product at room temperature and the optical functional face set on the design falls within a tolerance level.

BRIEF DESCRIPTION OF THE DRAWINGS

FIG. 1 is a view illustrating the construction of a mold to which a molding method of an optical element is applied, according to one embodiment of the invention.

FIG. 2 is a view illustrating a state in which an upper mold is moved upward.

FIG. 11 illustrates the construction of a mold to which a molding method for an optical element is applied according to another embodiment of the invention.

FIG. 12 illustrates the shapes of molding faces of upper and lower molds used for molding a meniscus lens, and the shapes of optical functional faces of the molded concave lens, each shape being investigated by a Fizeau's interferometer.

FIG. 13 illustrates the shapes of molding faces of mold members with the contour map of the surface cancelled, and the shapes of optical functional faces of a concave lens molded by those mold members, each shape being investigated by a Fizeau's interferometer.

DESCRIPTION OF THE PREFERRED EMBODIMENTS

Figure 3:
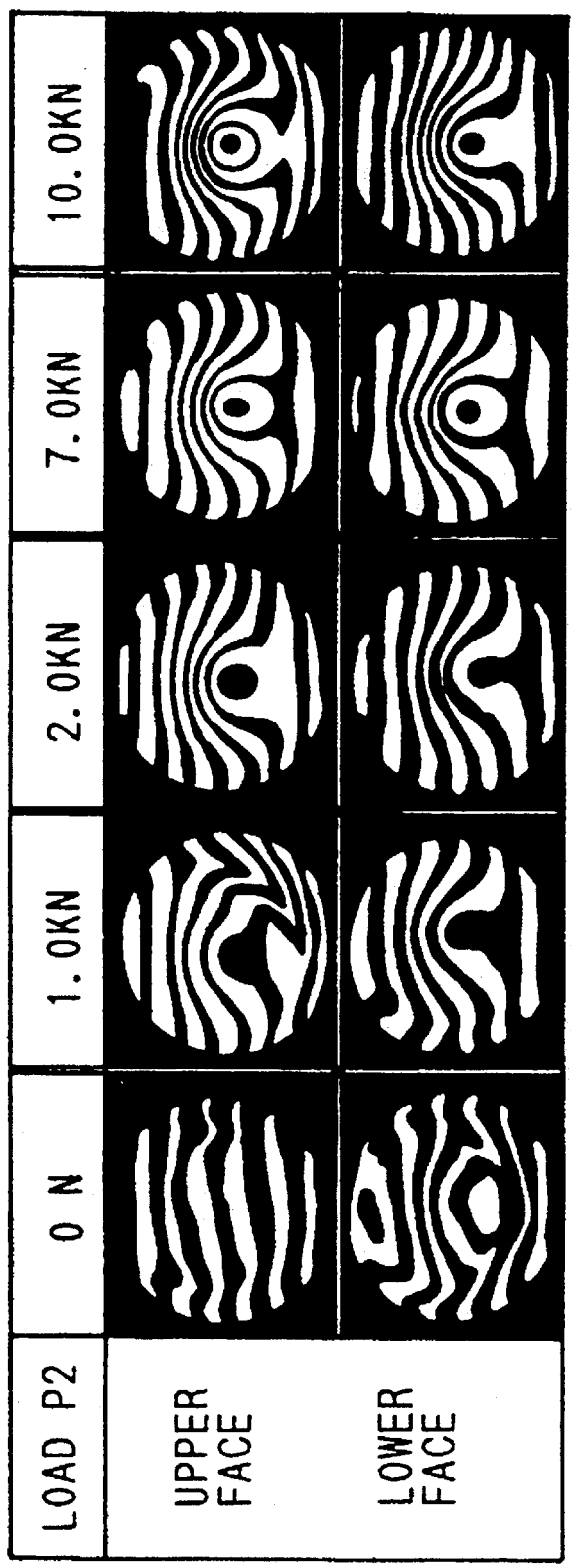
FIG. 3 illustrates how the optical functional face changes when the pressing force in cooling is changed.

A preferred embodiment of the present invention will be described below with reference to the accompanying drawings.

FIG. 1 illustrates the construction of a mold 12 to which a molding method of an optical element in one embodiment is applied. FIG. 1 also illustrates the construction of the mold 12 for molding a concave lens in a state in which the pressing operation of glass material 4 has been completed by an upper mold member 16 and a lower mold member 18, so that a glass lens has been substantially molded.

In FIG. 1, a shell mold 14 constituting the outer shell portion of the mold 12 is laid on a molding device body 10 of an optical element through support substrate 20. The shell mold 14 is formed like a prism of a substantial square shape as viewed from the above, with through holes 14a, 14b formed on its central axis, penetrating the shell mold 14 from top to bottom. Among these through holes, an upper through hole 14a has an upper mold member 16 which is formed like a column fitted thereinto to be slidable vertically. At the upper end of the upper mold member 16, a disk-like flange portion 16a is formed, whereby the upper mold member 16 is prevented from moving further downward by the lower face of the flange portion 16a which comes into direct contact with the upper face 14c of the shell mold 14 from upward, whereby, the press stroke of the upper mold member 16 downward is defined. Also, on the lower face of the upper mold member 16 is formed a molding face 16b for forming the optical element face by pressing glass material 40 and transferring a desired shape to its surface.

Above the upper mold member 16, an air cylinder 22 for producing a pressing force on to the glass material 40 is disposed, supported by a support member (not shown). Below the air cylinder 22, a piston rod 22a extends along a vertical direction, with the lower end of the piston rod 22a connected to the upper end face of the upper mold 16. Accordingly, when the air cylinder 22 is activated to push the piston rod 22a downward, a pressing force P1 is applied to the glass material 40.

A lower mold member 18 formed to be column-like similar to the upper mold member 16 is fitted through hole 14a so as to be slidable vertically. At the lower end of the lower mold member 18, a disk-like flange portion 18a is formed. The lower face 18c of the flange portion 18a is in direct contact with the upper face of the support substrate on which the shell mold 14 is laid. The pressing force P1 is applied downward from the upper mold member 16 through the glass material 40 onto the lower mold member 18 laid on the support substrate 20. On the upper end face of the lower mold member 18 is formed a molding face 18b for forming the optical functional face by transferring a desired shape to the lower face of the glass material 40.

Accordingly, the glass material 40 includes, on its upper plane, an optical functional face 40a to which the surface shape of the molding face 16b of the upper mold member 16 is transferred, and on its lower plane, an optical functional face 40b to which the surface shape of the molding face 18b of the lower mold member 18 is transferred.

The thickness of a molded concave lens (glass material 40) is defined by the lower plane of the flange portion 16a of the upper mold member 16 coming into direct contact with the upper plane 14c of the shell mold 14 as described above so that the thickness of the concave lens (40) may not change for each working.

An air cylinder 24 is secured to the lower plane of the molding apparatus body 10. A piston rod 24a of the air cylinder 24 is connected to the lower plane 18c of the lower mold member 18 sequentially through a through hole 10a formed in the molding apparatus body 10 and a through hole 20a formed in the support substrate 20. This air cylinder 24 acts to apply a pressure P2 on the concave lens (40) by pushing the lower mold member 18 upward, to prevent the concave lens (40) from collapsing in shape during cooling step after molding operation of the concave lens (glass material 40).

On the side plane of the shell mold 14 is formed an opening hole 14d, through which the glass material 40 is supplied into the inside of the mold 12. The concave lens (40) molded is taken out from the inside of the mold 12.

Heaters 26 are disposed within the shell mold 14 to heat the shell mold 14, the upper mold member 16 and the lower mold member 18, as well as heat the glass material 40 via the shell mold 14, the upper mold member 16 and the lower mold member 18. The heaters 26 are positioned at the four corners.

A procedure for molding the concave lens by the mold 12 thus constructed will be described below.

First, the piston rod 22a of the air cylinder 22 is retracted, whereby the upper mold member 16 is slid upward with respect to the shell mold 14, as shown in FIG. 2, to move away from the lower mold member 18. In this state, the glass material 40 heated to a predetermined high temperature is supplied onto the molding face 18b of the lower mold member 18 through the opening hole 14d of the shell mold 14 by means of an autohand or the like. The glass material 40 supplied at this time has been formed in a disk-like shape or in a substantially completed shape of the concave lens, when the concave lens is molded. Also, the shell mold 14, the upper mold member 16 and the lower mold member 18 have been heated up to temperatures corresponding to predetermined molding conditions.

After the glass material 40 is supplied onto the molding face 18b of the lower mold member 18, the piston rod 22a of the air cylinder 22 is extruded, so that the molding face 16b of the upper mold member 16 comes into direct contact with the upper plane of the glass material 40, and a pressing force P1 is applied on to the glass substrate 40. When the upper mold member 16 is moved downward gradually with this pressing force P1 applied, the glass material 40 is squashed down, finally resulting in a state as shown in FIG. 1. In this state, on the upper and lower planes of the glass material 40 are formed optical functional faces 40a, 40b to which the shapes of the molding face 16b of the upper mold member 16 and the molding face 18b of the lower mold member 18 are transferred respectively. The thickness of the glass material 40 is molded into a desired thickness.

Thereafter, the molded concave lens (glass material 40) is gradually cooled. In this cooling step, the air cylinder 24 is activated to push the lower mold member 18 upward so that the shape of the molded concave lens (40) may not collapse, whereby a pressing force P2 is applied on the concave lens (40). When the temperature falls down to a predetermined temperature, the air cylinder 22 is retracted again to move the upper mold member 16 upward, so that the concave lens is taken outside through the opening hole 14d of the shell mold 14 by means of an autohand or the like.

In a series of operations as described above, the concave lens (40) is molded, whereas the molding conditions by which the surface accuracy of the optical functional faces 40a, 40b of the concave lens (40) is possibly affected in the course of this molding process, include (1) pressing force P2 in the cooling step, (2) temperature difference of the upper and lower mold members 16, 18 during the cooling, and (3) cooling rate.

Herein, FIG. 3 shows the results in which the shapes of the optical functional faces of the concave lens (40) were investigated using a Fizeau's interferometer. The glass material 40 of a dense barium crown glass (SK12) was molded into the lens shape as shown in this embodiment by changing the pressing force P2 in cooling from ON to 10 kN.

According to the results of FIG. 3, release failure (failure of releasing from mold) takes place at the pressing forces below a point at which the pressing force P2 in the cooling is 2.0 kN. On the other hand, the concave lens has poorer surface accuracy with increasing the pressing force P2. Accordingly, it can be said that the optimal pressing force at which the occurrence of the release failures can be prevented to the minimum, and the surface accuracy of the concave lens is not degraded is 2.0 kN. But it is very difficult to control the pressing force at 2.0 kN precisely. Also, even if the pressing force P2 is controlled at 2.0 kN precisely, it is not possible to ensure that no release failure occurs at all and the shape precision is made better. Accordingly, even if the pressing force P2 in the cooling is set at 2.0 kN, all disadvantages can not be resolved.

It has been found that regarding a temperature difference of the upper and lower mold members 16, 18 during the cooling, the surface accuracy of optical functional face is not decreased so much by the temperature difference of about ±5° C., and that regarding cooling rate, the surface accuracy is hardly affected by the difference of cooling rate of about 1° C./min. to about 20° C./min.

In this embodiment as described above, the pressing force P2 is selected so as to prevent the occurrence of release failures securely even though the surface accuracy may decrease to some extent, but not to look for the best point to take balance of releasing ability and surface accuracy. However, it is important that the optical functional face is finished with good reproducibility and in the shape having the same contour map of the surface at all times, when molding a plurality of lenses, even though the surface accuracy may decrease to some extent. Accordingly, if the lens is worked in the shape having the same contour map of the surface at every time of molding, the shapes of the molding faces for the mold members 16, 18 can be determined to cancel this contour map of the surface, so that the lens having theoretically no contour map of the surface can be produced when molding under the same conditions.

To this end, in this embodiment, in order to provide an invariable contour map of the surface on the lens to be molded for every time of molding, the temperature difference of the upper and lower mold members in cooling and the cooling rate are roughly controlled to be 0°×2.5° C. and 20°±5° C./min, respectively, and the pressing force P2 in the cooling is set at a high value of 5±1.5 kN. The setting of the cooling pressing force at such high value can securely prevent release failures from occurring, even though the surface accuracy of an optical functional face decreases slightly, resulting in good reproducibility of the shape of optical functional face.

Figure 4:
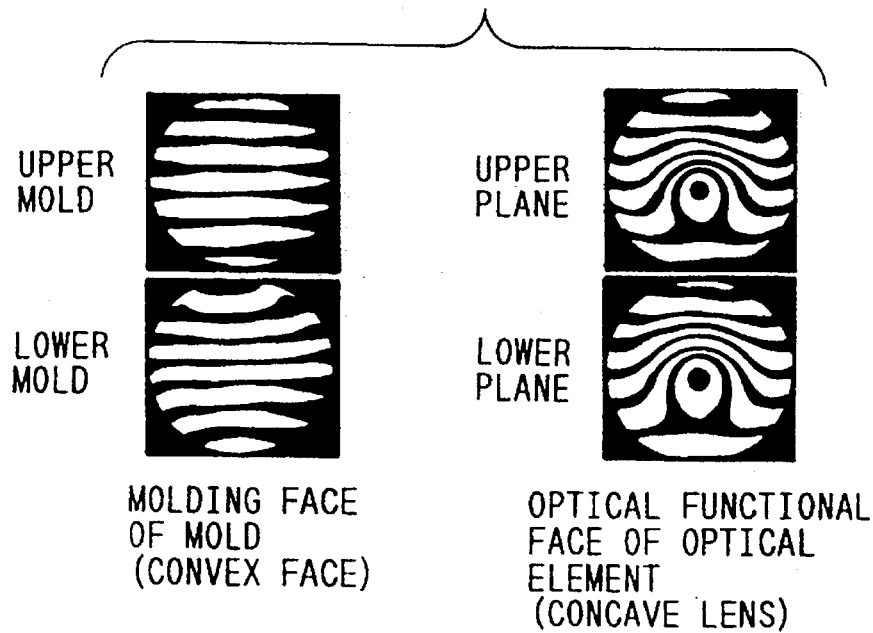
FIG. 4 illustrates the shapes of molding faces of upper and lower mold members used for molding a concave lens, and the shapes of optical functional faces of the molded concave lens, each shape being investigated by a Fizeau's interferometer.

FIG. 4 illustrates the results of examining the molding face shapes of the upper and lower mold members in molding a concave lens and the shapes of optical functional faces of molded concave lens under the above molding conditions by means of a Fizeau's interferometer. In this case, the shapes of the molding faces of the mold members are not made to cancel the contour map of the surface.

Figure 5:
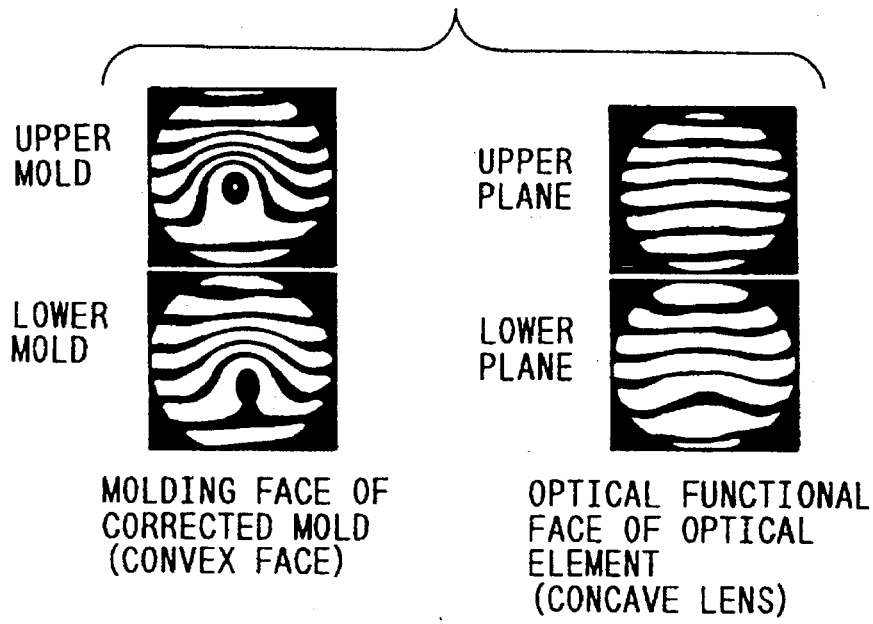
FIG. 5 illustrates the shapes of molding faces of mold members with the contour map of the surface cancelled, and the shapes of optical functional faces of a concave lens molded by the mold members, each shape being investigated by a Fizeau's interferometer.

A left-hand view of FIG. 5 illustrates the results of reading the contour map of the surface of the optical functional face for the concave lens from the results of FIG. 4 and examining the mold members, by means of a Fizeau's interferometer, having the molding faces worked into the shapes of cancelling the contour map of the surface. A right-hand view of FIG. 5 illustrates the shapes of the optical functional faces of the concave lens when molding using such mold members under the above molding conditions. As will be clear from the results of FIG. 5, it can be found that the concave lens molded with the method of this embodiment has the astigmatism and the contour map of the surface which are both less than one-fourth line (¼) of Newton ring, resulting in quite excellent surface accuracy. As a result of molding the concave lens continuously using the mold members of the shape with the contour map of the surface cancelled, all of the lenses had both the astigmatism and the contour map of the surface less than one-fourth line (¼) of Newton ring.

It should be noted that the contour map of the surface for the optical functional faces of the lens is read from the number of Newton ring lines as described above, and then the molding faces of the mold members 16, 18 can be manually worked into the shapes so as to cancel this contour map of the surface. However, such a manual operation for working the mold is quite troublesome, but in practice, the working of the mold is subjected to automatic process using an NC machine tool, as hereinafter described.

Figure 6:
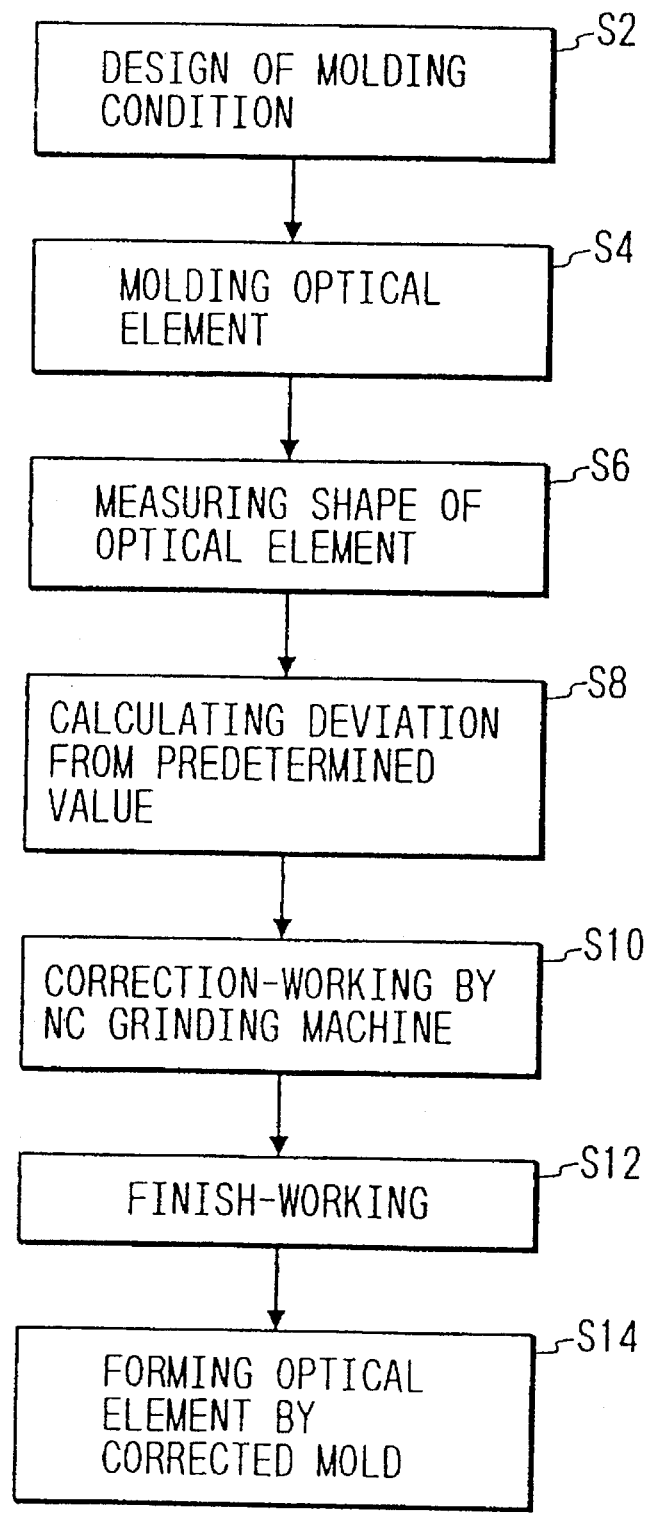
FIG. 6 is a flowchart showing the procedure for correction-working the mold members into a shape in such a manner that the contour map of the surface for the optical functional faces of concave lens is cancelled.

FIG. 6 is a flowchart showing the procedure for correction-working the mold members into the shapes so as to cancel the contour map of the surface for the optical functional faces of the concave lens.

First, at step S2, the molding conditions are set such that the contour map of the surface for the lens to be molded become constant for every molding. In this embodiment, the glass material 40 is a dense barium crown glass (SK12) as previously described, the temperature difference of the upper and lower mold members 16, 18 in the cooling is 0°±2.5° C., the cooling rate is 20°±5° C./min, and the pressing force P2 in the cooling is 5+1.5 kN.

At step S4, the lens is molded under the above molding conditions by the same method as conventionally used. In this case, by setting the molding conditions as above shown, any shape error which is not axial symmetrical around the optical axis of the concave lens (40) can be completely prevented.

Figure 7:
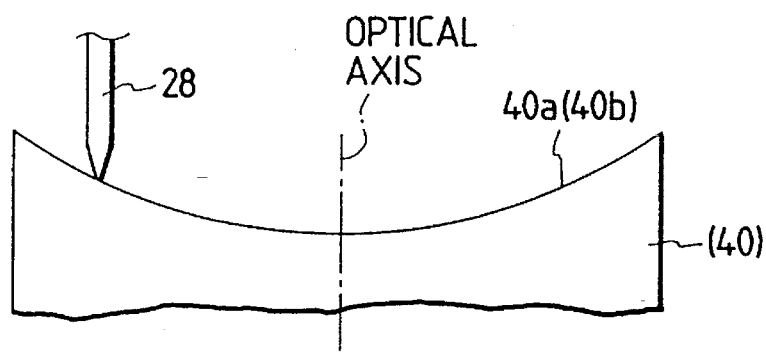
FIG. 7 illustrates how the shape of the optical functional face of a lens is measured by a tally-surf.

At step S6, the shapes of the optical functional faces 40a, 40b are measured along the straight line passing through the optical axis, with a tracer 28 of a well known tracer-type shape measuring device (tally-surf) placed on the optical functional face 40a, 40b of the concave lens (40) molded at step S4, as shown in FIG. 7. Since the shapes of the optical functional faces of the concave lens (40) molded are in axial symmetry, measurement with the tally-surf is necessary to be made along only one line.

Figure 8:
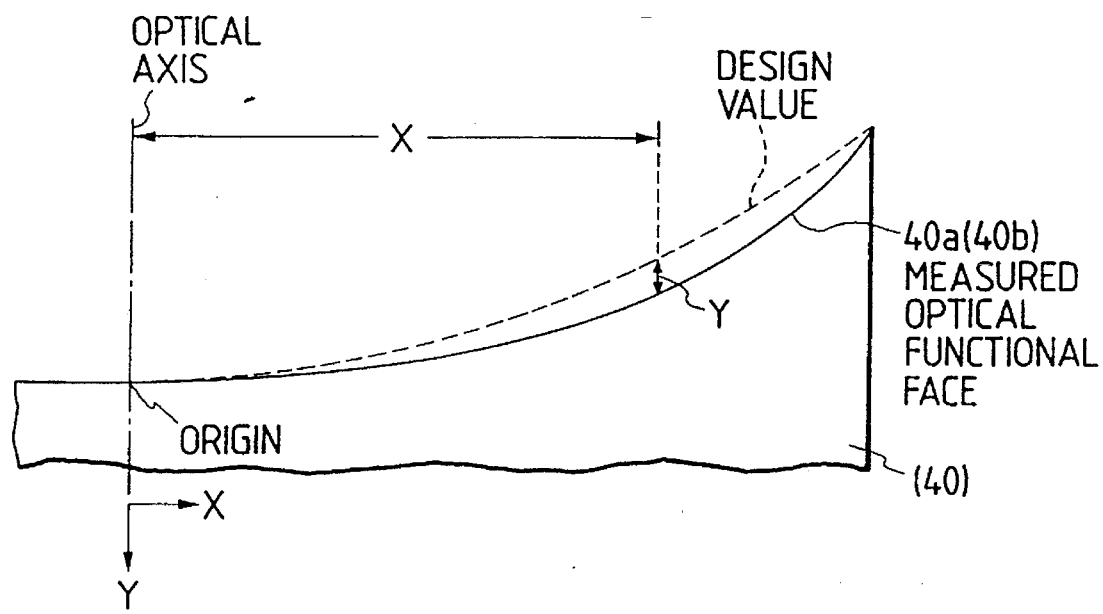
FIG. 8 illustrates the shape error of a lens represented by the distance X from the optical axis and the deviation Y from a design value.

At step S8, the deviation of the measured value at step S6 from the design value of the optical functional faces 40a, 40b of the concave lens (40) is calculated. Since the measured values are distributed symmetrically around the entire periphery with respect to the optical axis as described above, if the deviation in the Y direction is calculated at a certain position in the X direction from the optical axis as shown in FIG. 8, this value can be applied around the entire periphery of the concave lens (40).

Figure 9:
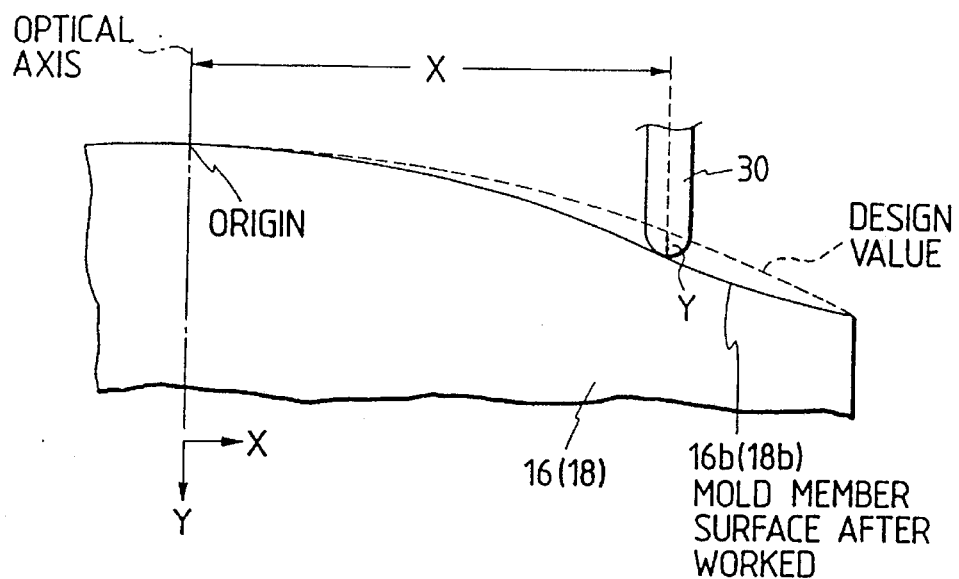
FIG. 9 illustrates how the molding face of a mold member is correction-worked.

At step S10, the deviation calculated at step S8 as shown in FIG. 9 is input into an NC grinding machine 30 commercially available, in the form of (X=distance from the optical axis, Y=deviation from the design value), so that the molding faces 16b, 18b of the upper and lower mold members 16, 18 are correction-worked. In this way, with such correction-working of the molding faces 16b, 18b of the molding members 16, 18, the molding faces 16b, 18b are worked into the shapes so as to cancel the shape error of the concave lens.

Figure 10:
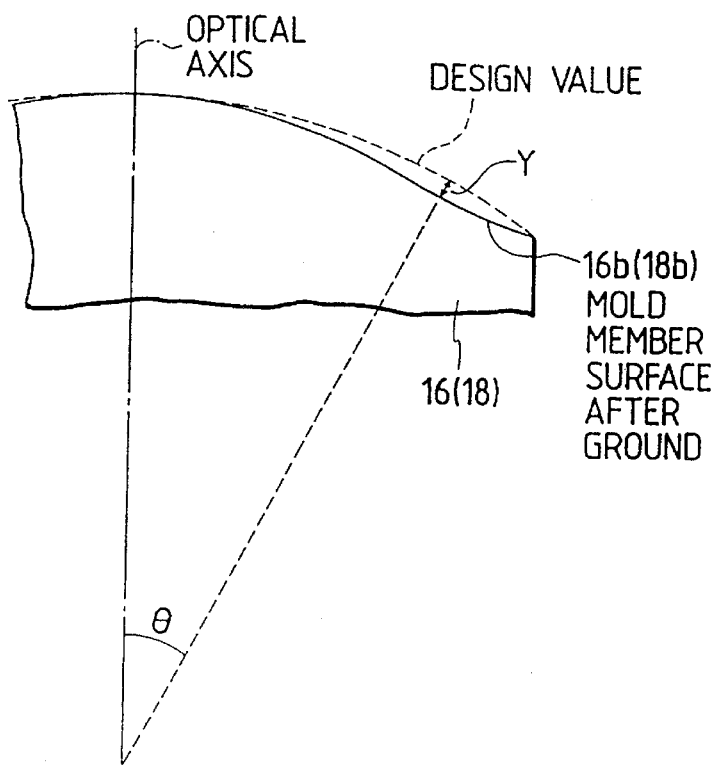
FIG. 10 illustrates the shape of a molding face of a mold member represented in (r, θ) coordinates.

Next, at step S12, the molding faces 16b, 18b ground by the NC grinding machine are subjected to finish-working. The working data X, Y as already calcuated are converted to a cylindrical coordinates system, that is, consisting of the angle θ from the optical axis and the deviation r of optical functional face at its angle from the design value, as shown in FIG. 10, whereby the molding faces are finish-worked by an apparatus and method as disclosed in U.S. Pat. No. 4,956,944.

At step S14, the concave lens is molded using the corrected mold members produced in the steps from S2 to S12 as mentioned above under the molding conditions set at step S2.

As a result of molding the concave lens according to the above procedures, the concave lens could be molded at a accuracy in which the deviation of the optical functional face from the design value is 0.33 μm or less.

Other Embodiments

FIG. 11 illustrates another embodiment, where a meniscus lens is molded. In this other embodiment, the glass material 40' is a flint glass (F8).

In this other embodiment, since the shape of the lens to be molded is different from the one embodiment as previously described, the temperature difference of the upper and lower mold members during cooling may exert greater influence on the surface accuracy of the optical functional face of lens than the pressing force P2 upon cooling. Therefore, the molding conditions are roughly controlled so that the pressing load P2 in cooling is 3.0+1.5 kN and the cooling rate is 20°±5° C./min. Also in order to stabilize the surface accuracy of the optical functional face at each molding, the temperature of the upper mold member 16 is set at 7.5°±2.5° C. above the temperature of the lower mold member 18.

FIG. 12 illustrates the results of examining the shapes of molding faces of the upper and lower mold members when the meniscus lens is molded under the above molding conditions and the shapes of optical functional faces of a molded optical element by means of a Fizeau's interferometer.

A left-hand view of FIG. 13 illustrates the results of reading the contour map of the surface for the optical functional face for the meniscus lens from the results of FIG. 12 and examining the mold members having the molding faces worked into the shapes so as to cancel the contour map of the surface by means of a Fizeau's interferometer. A right-hand view of FIG. 13 illustrates the shapes of the optical functional faces of the meniscus lens when molded using such mold under the above molding conditions. As will be clear from the results of FIG. 13, it can be found that the meniscus lens molded with the method, of this embodiment has the astigmatism and the contour map of the surface below one-fourth line (¼) of Newton ring, resulting in quite excellent surface accuracy. As a result of molding the meniscus lens continuously using the mold members having the shape of the cancelled contour map of the surface, all of the lenses had the astigmatism and the contour map of the surface below one-fourth line (¼) of Newton ring.

It should be noted that in this other embodiment the correction-working of the mold members can be made in the exactly same way as the one embodiment according to the flowchart of FIG. 6. Thus, according to the molding method for an optical element in the above embodiment, it is possible to mold the optical element into the shape as conventionally difficult with high accuracy, using a quite basic apparatus similar to that as conventionally used, and without the need of controlling the highly precise molding conditions.

The present invention is also applicable to the modifications or variations of the above embodiment in the range without departing from the spirit of the invent ion.

For example, the above embodiment is related to the molding of the concave lens and the meniscus lens, whereas the present invention is also applicable to the molding of other shapes of optical elements, e.g., a convex lens or a plane-like optical element.

As described above, according to the molding method for an optical element of the present invention, the molding conditions are set so that the contour map of the surface appearing on the completed optical element may be constant at all times, and the molding faces of the mold members are worked into the shapes so as to cancel the constant contour map of the surface, whereby it is possible to work an optical element having high surface accuracy. The molding conditions such that the contour map of the surface always becomes constant are not required to be controlled .as strictly as the molding conditions necessary to always finish the optical element with high surface accuracy. Therefore, it is possible to produce easily high accurate optical elements.

Next, a mold and a producing method thereof according to the second embodiment of the invention will be specifically described below by way of example in connection with the drawings.

Figure 14A:
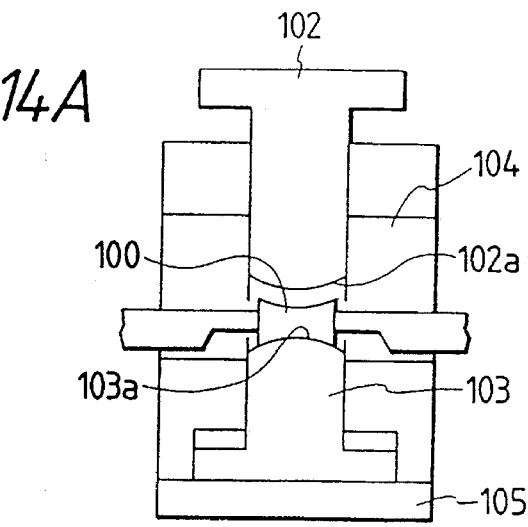
FIGS. 14A to 14D are schematic views showing one embodiment of a molding method of the present invention in a working sequence (FIGS. 14A, 14B, 14C), and a process flow of correcting the shape of molding face of the mold in FIG. 14D.
Figure 14B:
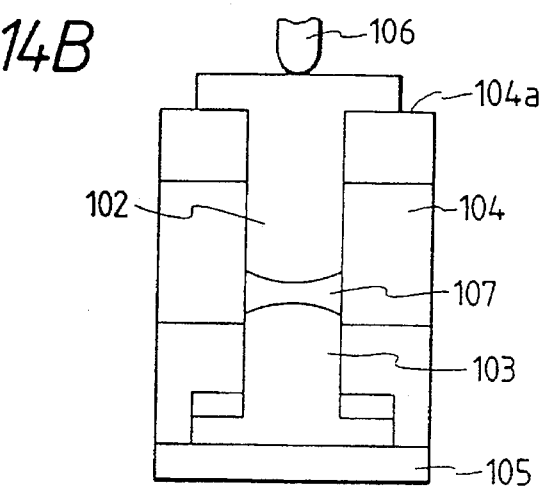
Figure 14C:
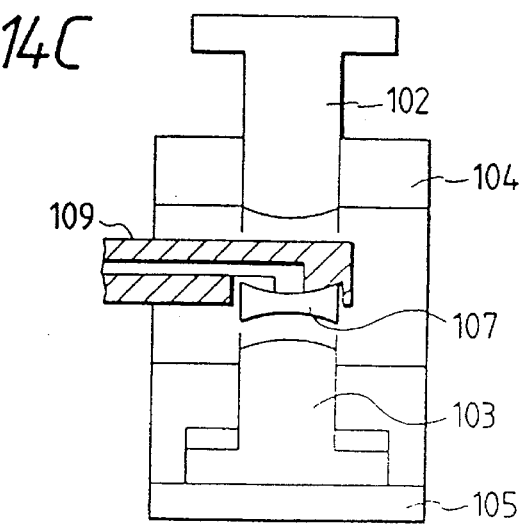

First, a molding process using the mold will be outlined herein. The molding process is shown, in which a lens concave on both faces (e.g., diameter: 15 mmφ, central wall thickness: 0.8 mm, radius of curvature on the optical functional face: R=30 mm) is molded from the spherical glass blank. The glass blank as used herein is a glass material 1 of dense barium crown glass SK12, which is prepared in, for example, a shape concave on both faces having a diameter of 15 mmφ, a central wall thickness of 1.2 mm, and a radius of curvature on the optical functional face of R=31 min. A mold as shown in FIGS. 14A to 14C is made of, for example, W—C alloy, and is accommodated within a casing (not shown). The casing contains nitrogen gas introduced therein after the pressure reduction to, for example, $1 \times 10^{-2}$ Torr. An upper mold member 102 and a lower mold member 103 constituting the mold are heated near 620° C. (with glass viscosity of $10^{9.7}$) by a heater (not shown) provided on a shell mold 104 surrounding them. When the mold members 102, 103 are heated up to the above-mentioned temperature, the glass material 1 preheated (e.g., 620° C.) within the same casing is sucked by using a suction hand 109, and is laid on a molding face 103a of the lower mold member 103 through an access port opened in the shell mold 104 (see FIG. 14A). The shell mold 104 is installed on a base 105.

The upper mold member 102 is lowered through manipulating means 106 such as a ram to enable the press molding. A glass material 100 is preheated up to 620° C. (with glass viscosity of $10^{9.7}$ poise) in advance as described above, and is loaded between the mold members 102, 103, but it will be appreciated that the glass material may be heated to the temperature after loading. The upper mold member 102 is continuously lowered until a stopper portion provided at the upper edge of the mold member 2 comes into contact with an upper plane 104a of the shell mold 104, while the temperature is maintained to heat uniformly the glass material. In the course of lapse of a predetermined time, each molding face 102a, 103a of the mold members 102, 103 is transferred onto each surface of the glass material 1, so that the glass material 1 is molded into a predetermined molded product 107 (FIG. 14B). The pressing load in this case is as large as 320 kgf, and the thickness of the molded product 7 is determined to the level at which the stopper portion abuts on the upper plane 4a of the shell mold 4.

Thereafter, the heater is deenergized, and the cooling is conducted by passing nitrogen gas, for example, through cooling passages (not shown) provided on the respective mold members 102, 103. The mold is then opened at the time when the temperature of the molded product (optical element) 107 falls below a glass transition point, e.g., 480° C. (with mold pressure being zero), and the molded product is taken out (FIG. 14C). The cooling rate is 20° C./min, for example, so that non-uniform temperature distribution may not occur in the molded product within the mold during the cooling.

Next, the situation of the thermal stress occurring due to a difference between thermal expansion coefficients of the mold and the glass material in the cooling step of such a molding process will be considered below. Table 1 as listed herein indicates the thermal characteristic temperatures of the glass material, and Table 2 indicates the mechanical properties of the glass material and the mold in the cooling step of the molding process.

TABLE 1

| Softening point | Yield point | Transition point | Slow cooling point | Strain point |
| --- | --- | --- | --- | --- |
| 672° C. | 588° C. | 550° C. | 534° C. | 503° C. |

TABLE 2

|  | Young's modulus | Poisson's ratio | Thermal expansion coefficient |
| --- | --- | --- | --- |
| Glass | Visco-elastic characteristic | 0.25 | Function of temperature (see FIG. 25) |
| Mold | $5.80 \times 10^4$ kgf/mm$^2$ | 0.2 | Function of temperature (see FIG. 25) |

Figure 25:
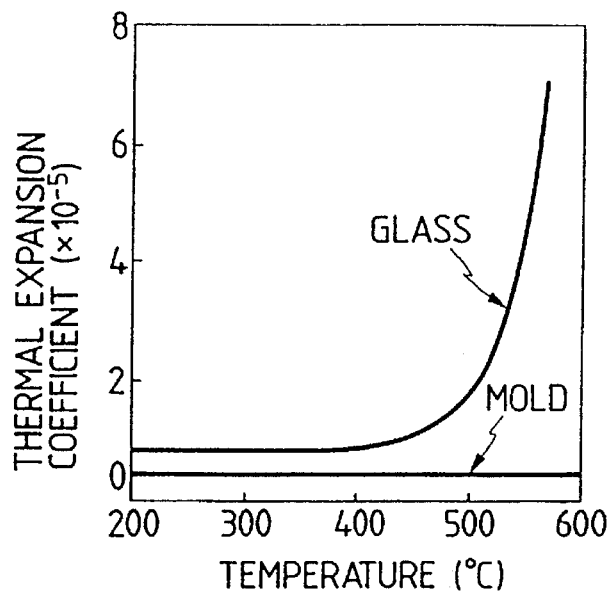
FIG. 25 is a graphic representation for explaining the difference between the thermal expansion coefficient of a molded product and that of a mold in the above embodiment.

FIG. 25 illustrates how the thermal expansion coefficients of the glass material and the mold change for every 10° C. in the cooling step of the molding process. The thermal expansion coefficient of the glass material is greater than that of the mold, particularly exhibiting great change in the region of high temperatures.

The visco-elastic characteristic of the glass material in the cooling step of is the molding process of remarkable in the range of temperature corresponding to a range in which the glass viscosity is from $10^{12}$ to $10^{15}$ poise, which temperatures lie between the molding temperature (620° C.) and the releasing temperature (480° C.). Typically, the material having the visco-elastic characteristic is involved in two specific phenomena in the analysis of the stress condition, one of them being a creep phenomenon in which deformation is sustained if a fixed force is loaded on the visco-elastic material, and the other being a stress relaxation phenomenon in which if the visco-elastic material having a stress is held at a constant temperature, the stress decreases.

We have determined that upon molding the optical element, the matters to be considered concerning the thermal stress are the creep phenomenon and the stress relaxation phenomenon, and have verified these. First of all, the glass sample in the visco-elastic temperature range is subjected to a bending test of continuously applying a fixed load thereto in three-point bent state, while being held at constant temperature in order to measure deflection of the sample, whereby the creep compliance indicating the easiness of creep deformation is obtained.

$$D_c(t,T) = 4\ bd^3/l^3 \times v(t)/WO$$

Where Dc(t,T) is a creep compliance after loading t seconds at a temperature T° C., b is a width of a specimen, d is a length of specimen, l is a span distance, v(t) is deflection on the loading point after loading t seconds, and WO is a load.

Figure 16:
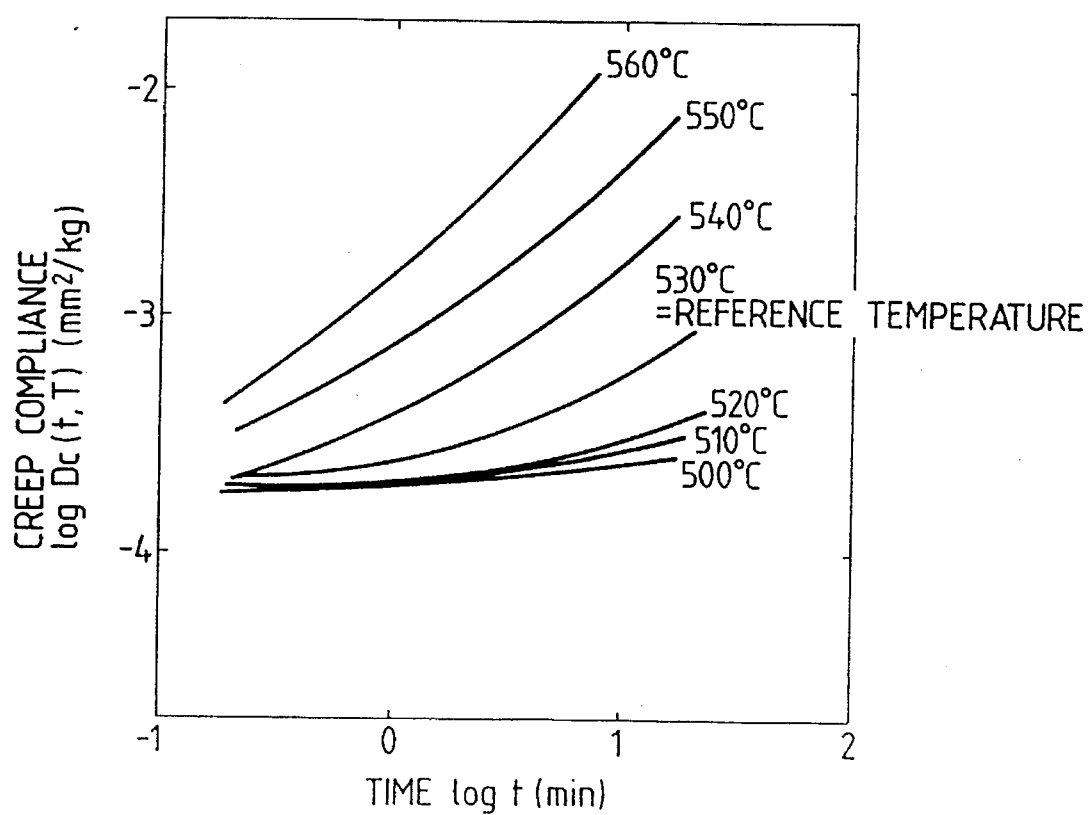
FIG. 16 is a graphic representation for explaining the visco-elastic characteristic of creep compliance of an optical element.

FIG. 16 shows the creep compliance at each temperature of the glass in the above embodiment of the present invention. The glass in the region of visco-elastic temperatures has a simple property of thermal rheology, so that the creep compliance curves can be integrated into one creep compliance curve (represented as a master curve in FIG. 17) by moving each creep compliance curve of each temperature in parallel horizontally.

Figure 19:
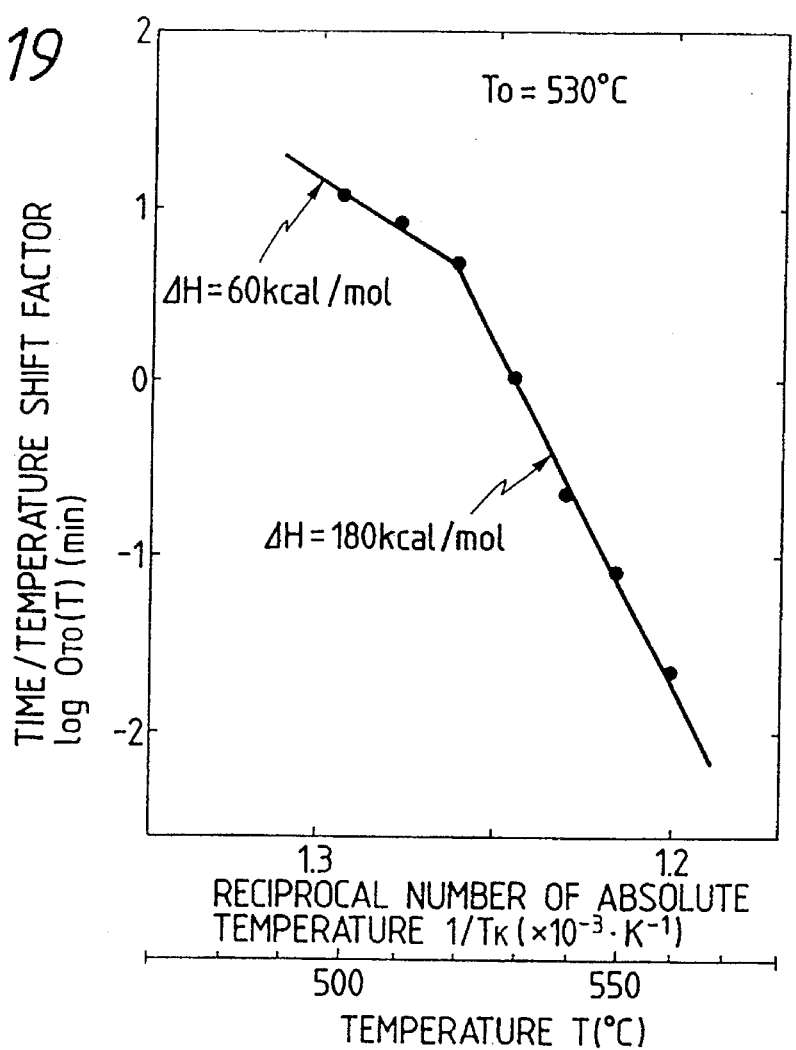
FIG. 19 is a graphic representation for explaining the visco-elastic characteristic by showing a master curve of the relaxation elastic modulus of an optical element.
Figure 20:
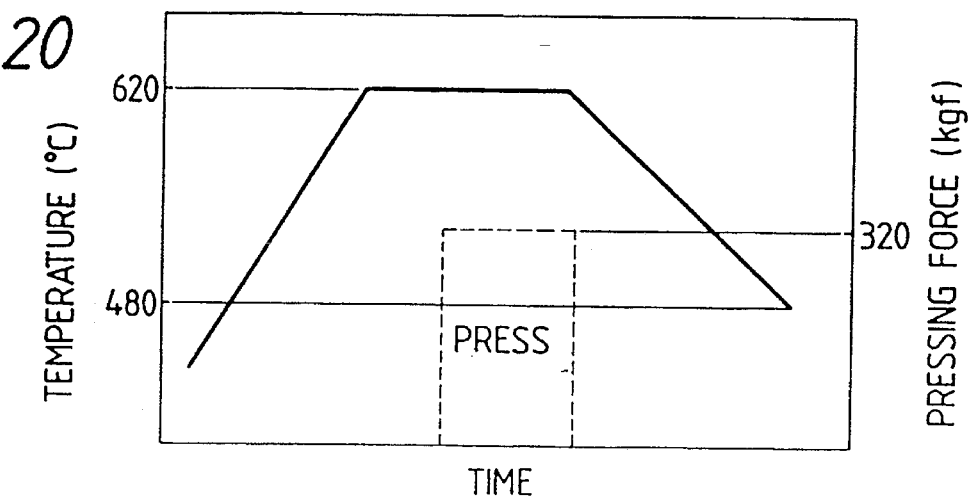
FIG. 20 is a graphic representation for explaining a molding process in the embodiment.

In this way, a master curve of creep compliance is obtained by moving in parallel the creep compliance curve of each temperature by the amount corresponding to a certain time, and the relation between temperature and time can be represented by a time/temperature shift factor (FIG. 19). The time/temperature shift factor of the glass as shown herein can be approximated by two straight lines (Arrhenius' equation), the temperature at the point of intersection being slightly lower than the transition point temperature of the glass.

Figure 17:
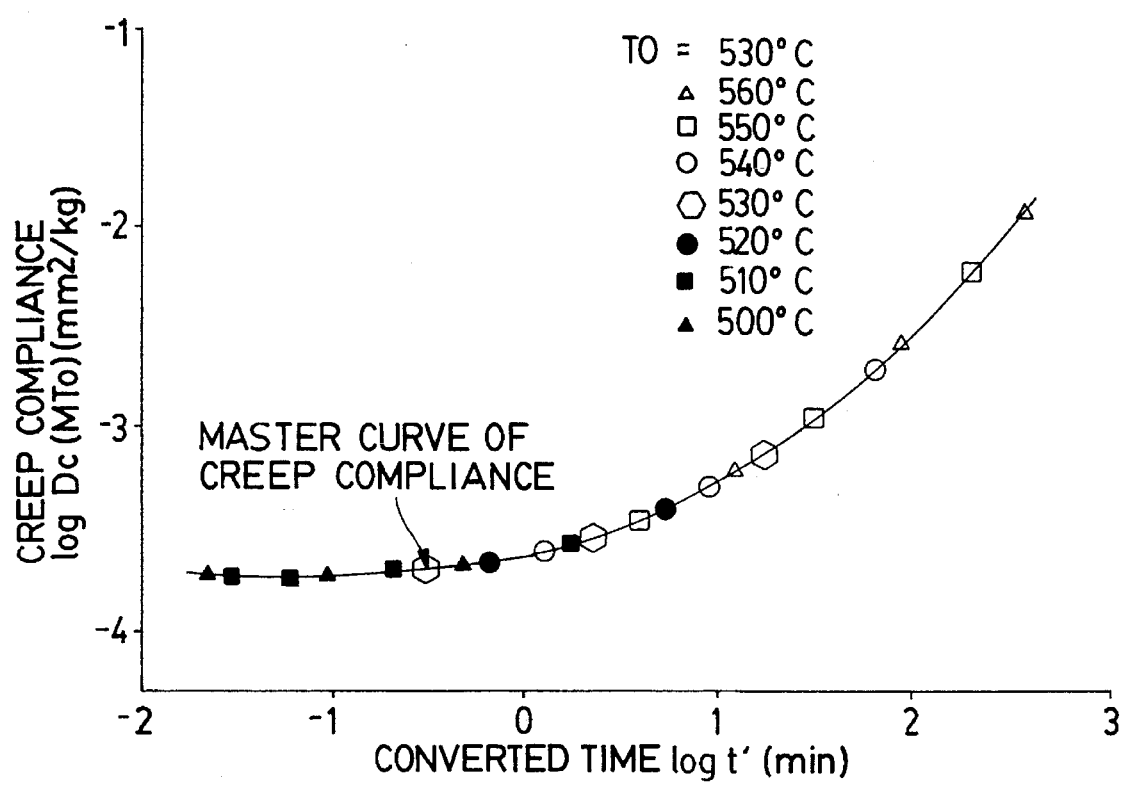
FIG. 17 is a graphic representation for explaining the visco-elastic characteristic by showing a master curve of the creep compliance of an optical element.
Figure 18:
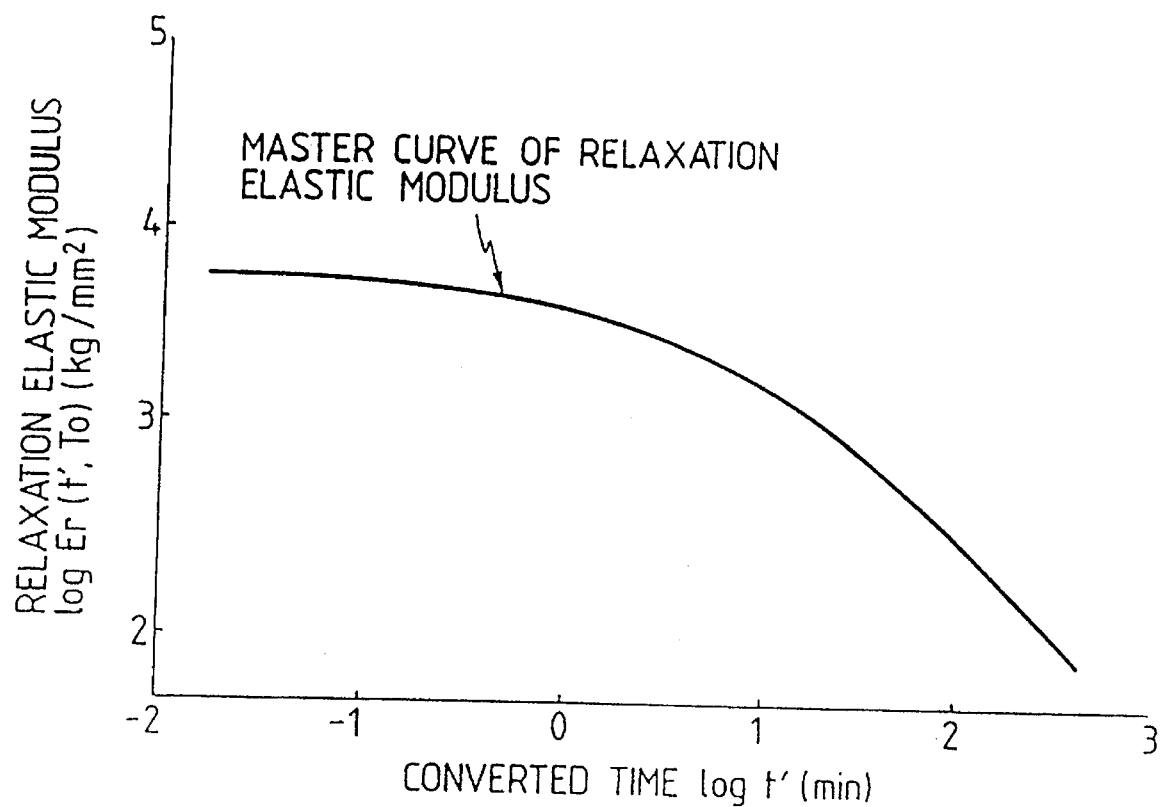
FIG. 18 is a graphic representation for explaining the visco-elastic characteristic of a relaxation elastic modulus of an optical element.

The relaxation elastic modulus corresponding to the elastic modulus of normal elastic material in the visco-elastic material can be adopted as the function of temperature and time due to the influence of stress relaxation phenomenon, but because the glass an object has the simple property of thermal rheology, the same master curve of creep compliance as mentioned above (typically, the master curve of relaxation elastic modulus can be approximated by the inverse of the creep compliance master curve of FIG. 17) can be obtained (FIG. 18).

That is, in the case of the visco-elastic material having the simple property of thermal rheology as described above, by calculating the relaxation elastic modulus $E_r(t,T)$ at a certain temperature T° C. from the master curve of relaxation elastic modulus of FIG. 18 and the time/temperature shift factor of FIG. 19, it is possible to represent the relation between stress σ and strain ε, that is, the construction equation by an expression of history integration (shown below) in the linear visco-elastic theory.

$$\sigma_{(t)} = \int_o^t E_r(t-\tau,T) \frac{d\epsilon(\tau)}{d\tau}\ d\tau$$

That is, if the numerical analysis is made with the finite element method using this construction equation, the thermal stress can be calculated in consideration of the stress relaxation phenomenon of visco-elastic material.

Thus, to introduce the visco-elastic characteristic into the numerical analysis, the numerical expression involving the master curve of relaxation elastic modulus and the time/temperature shift factor is needed. The time/temperature shift factor is approximated by Arrhenius' equation as described above. The master curve of relaxation elastic modulus is approximated by Prony expansion.

In this way, the master curve of relaxation elastic modulus and the time/temperature shift factor can be obtained by measuring the creep compliances of the glass in the region of visco-elastic temperatures, so that the stress relaxation phenomenon of visco-elastic material can be numerically analyzed, and the thermal stress occurring in the optical element during the cooling can be analyzed by taking into consideration the stress relaxation due to visco-elasticity.

Figure 14D:
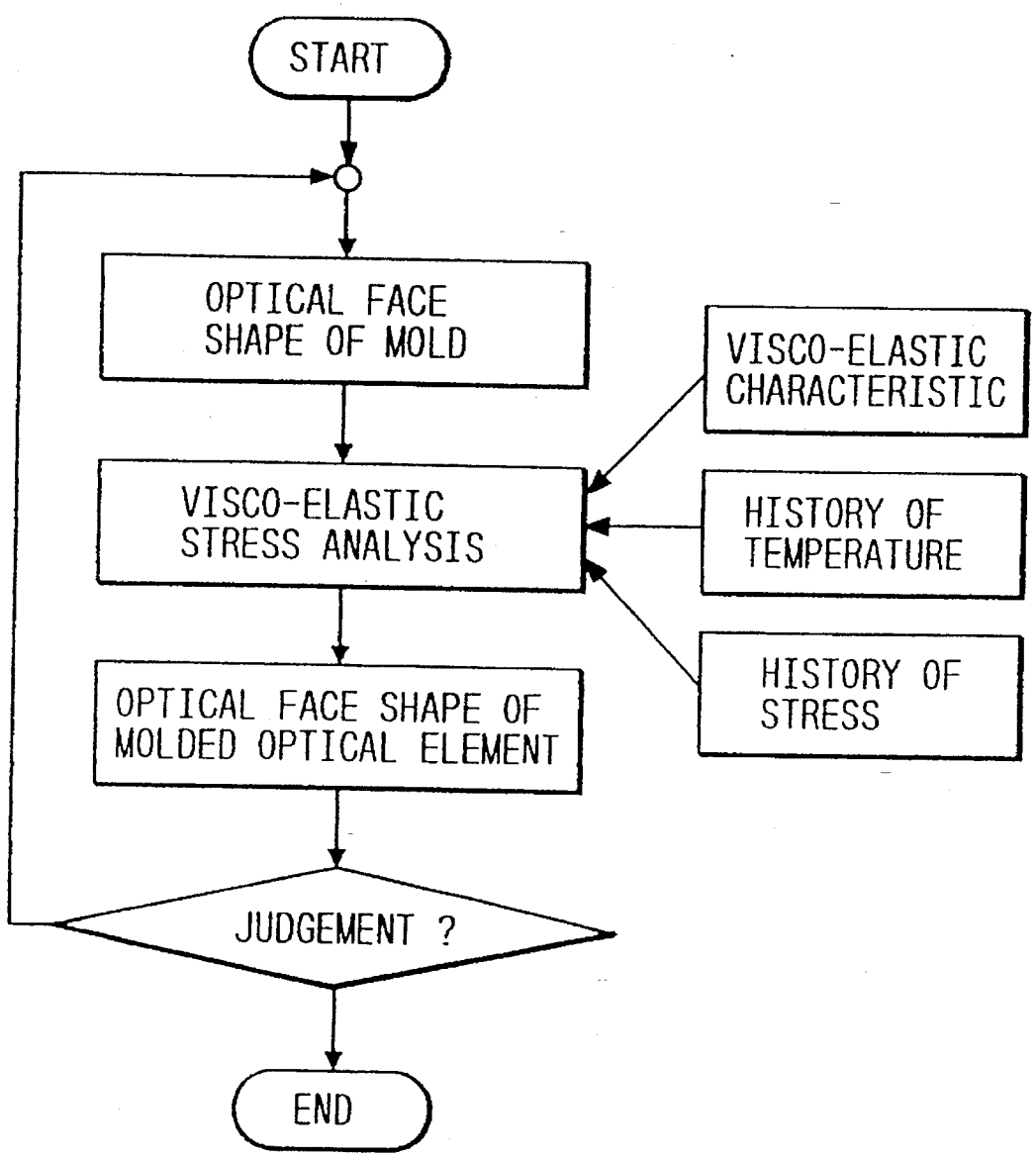
Figure 15:
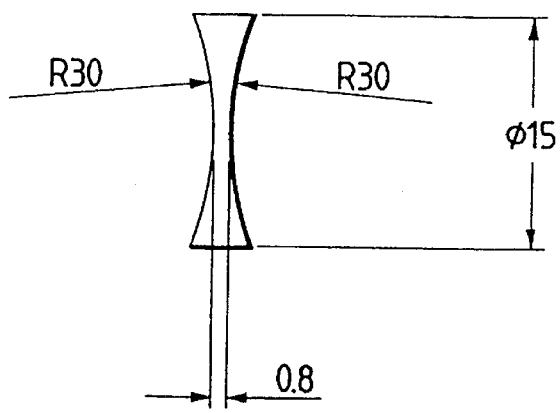
FIG. 15 is a side view of a molded product of an optical element in the above embodiment.

The correction for the molding faces of the mold in such molding process is performed as follows. That is, when the optical element material is press-molded by using the mold in accordance with the process as schematically shown in FIG. 14D, the thermal stress produced on an optical element molded product within the mold in a visco-elastic temperature range or elastic temperature range of the optical element material in the cooling step of a molding process to be performed is numerically analyzed based on a visco-elastic characteristic of the optical element material. Then the correction for the molding faces of the mold is made based on the value obtained by the numerical analysis so that the error between the optical functional face of an optical element molded by the mold at room temperature and optical functional face set on a design may fall within an acceptable tolerance level, thereby determining the molding face adapted to a shape of optical functional face set on the design.

This calculation procedure is specifically described in connection with the embodiment. In the numerical analysis of the thermal stress, the temperature history and/or pressing force history when this thermal stress occurs, is applied to the calculation basis. First of all, supposing that the optical element molded product is in a viscous state while the optical element molded product is cooled from a press molding temperature (620° C.) to 560° C., the thermal stress produced for that period is relaxed instantaneously as already described, whereby it is possible to assume that no stress remains within the molded optical element product.

Then, supposing that the molded optical element product is in a visco-elastic state while the optical element molded product is cooled from 560° C. to 500° C., the thermal stress produced for that period can be numerically analyzed by taking into consideration the stress relaxation phenomenon due to visco-elasticity. The numerical analysis is accomplished by the finite element method. That is, by incorporating the master curve of relaxation elastic modulus of FIG. 5 obtained from the creep test of material and the value of time/temperature shift factor of FIG. 19 into a structural analysis program of finite element method, the thermal stress produced within the optical element molded product during the cooling is numerically analyzed in consideration of the stress relaxation phenomenon due to visco-elasticity. In this case, in order to take into consideration the visco-elastic characteristic of material and the non-linearity of thermal expansion coefficient as shown in FIG. 25, the numerical calculation of thermal stress in this temperature range is performed at every 60 steps.

Finally, supposing that the molded optical element product is in an elastic state while the molded optical element product is cooled from 500° C. to room temperature, the stress produced for the period can be numerically analyzed by the finite element method. That is, in this embodiment, it is considered that the optical functional face of molded optical element product and the molding face of mold are placed in a closely contact state to each other during the period from the press molding to the releasing and are cooled, therefore, the thermal stress increasingly produced within the molded optical element product during cooling from 500° C. to 480° C., is numerically analyzed. If it is released from the mold at 480° C., the constraint by the mold members is released in the molded optical element product so that the product is deformed by residual thermal stress. The shape variation of the molded optical element product is analyzed by elasticity calculation of the finite element method, and further the shape variation of the molded optical element product upon cooling down to room temperature is likewise numerically analyzed by the finite element method. In this case, in order to take into consideration the non-linearity of thermal expansion coefficient of material as shown in FIG. 25, the numerical calculation of the thermal stress in this temperature range is performed at every 40 steps. In this embodiment, for the calculation of thermal stress, it is presumed that there is no non-uniform temperature distribution in the molded optical element product within the mold during the cooling as well as the mold.

Figure 46:
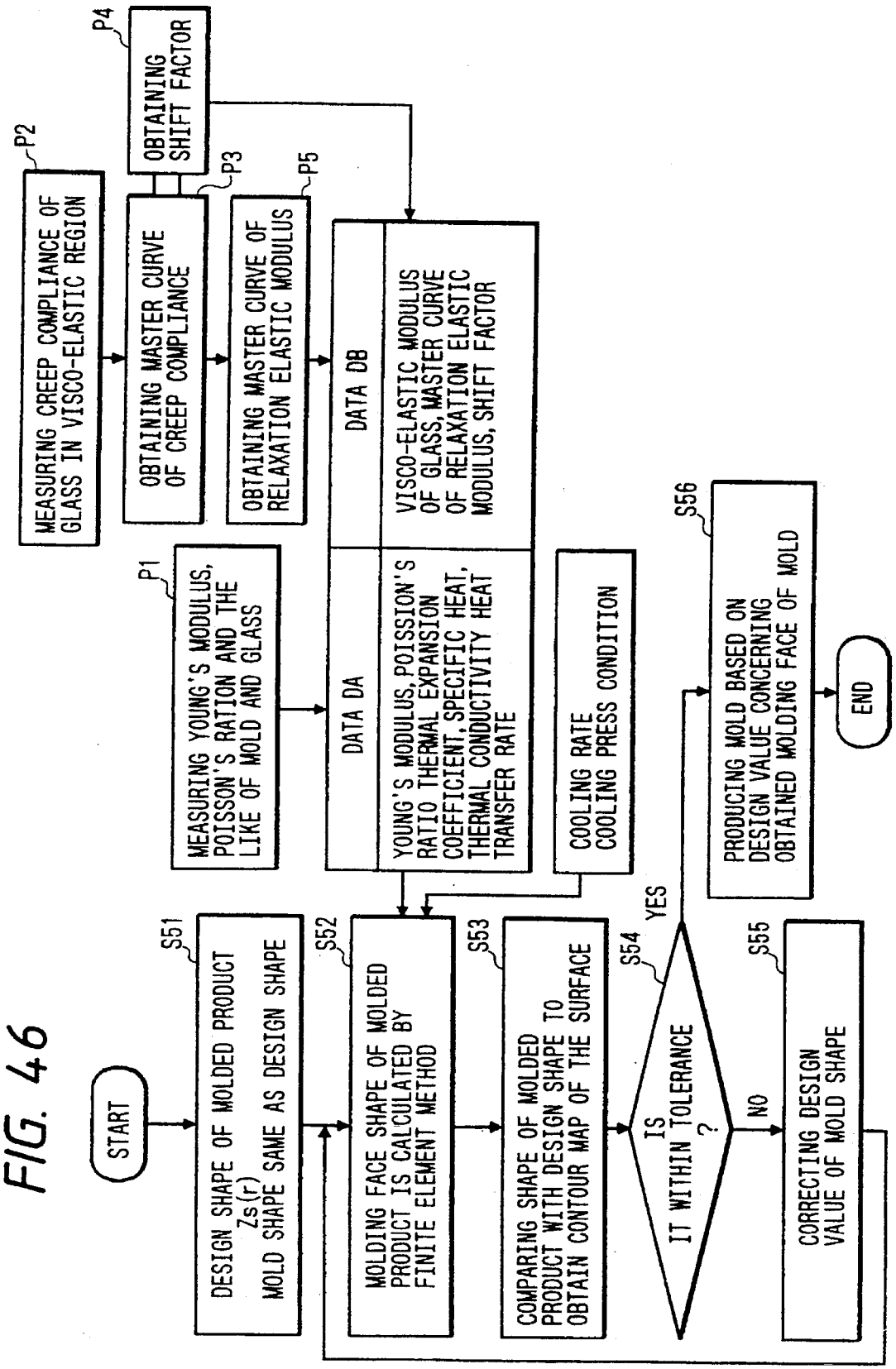
FIG. 46 is a flowchart showing collectively a specific process for producing method of a mold according to the present invention.

The specific flow of the numerical calculation process is shown in FIGS. 46 to 49. A flowchart of FIG. 46 shows collectively the total process of numerical calculation. At step S51, first of all, numerical data concerning the ideal shapes as a target for the optical functional faces of an optical element are picked up as the initial setting values of the molding faces of the mold members. Next, at step S52, the shapes of optical functional faces of a molded product to be expected upon completion, are calculated under the given conditions by the finite element method. For this purpose, various data necessary for the numerical calculation must be prepared. Accordingly, for this step S52, Young's modulus, Poisson's ratio, thermal expansion coefficient, specific heat, heat conductivity, heat transfer rate of the mold members and the glass material are measured in another measurement process P1, and stored in a calculation memory as data DA. Also, the creep compliance of the glass in the visco-elastic region is measured in a measurement process P2, and further the master curve of the creep compliance, the shift factor and the master curve of relaxation elastic coefficient are obtained in the processes P3, P4 and P5, respectively. The results are stored in the calculation memory as data DB. Besides, the cooling temperature and the pressing force during the cooling are set as further conditions.

At step S52, the thermal stress of the mold members and the glass molded product in the visco-elastic region is calculated, the thermal stress of the mold members and the glass molded product in the elastic region until released from the mold is calculated, and the deformation (spring back) of the glass molded product due to releasing from the mold is calculated. Further, the numerical value concerning the shape of the glass molded product when cooled down to room temperature is calculated. The final value is compared with the initial shape value at step S53, as will be described later, to obtain the contour map of the surface. At step S54, a determination is made whether or not the calculated value of an the shape of optical functional face of a glass molded product is within a range of design tolerance. If it is out of the tolerance, numerical data for the initial shape of the mold member is corrected at step S55, and the procedure feeds back to step S52. If it is within the tolerance, the value is picked up as the design value concerning the shape of molding face of the mold member at step S56, and adopted as data for an NC control grinding machine and a molding face polishing machine.

Figure 47:
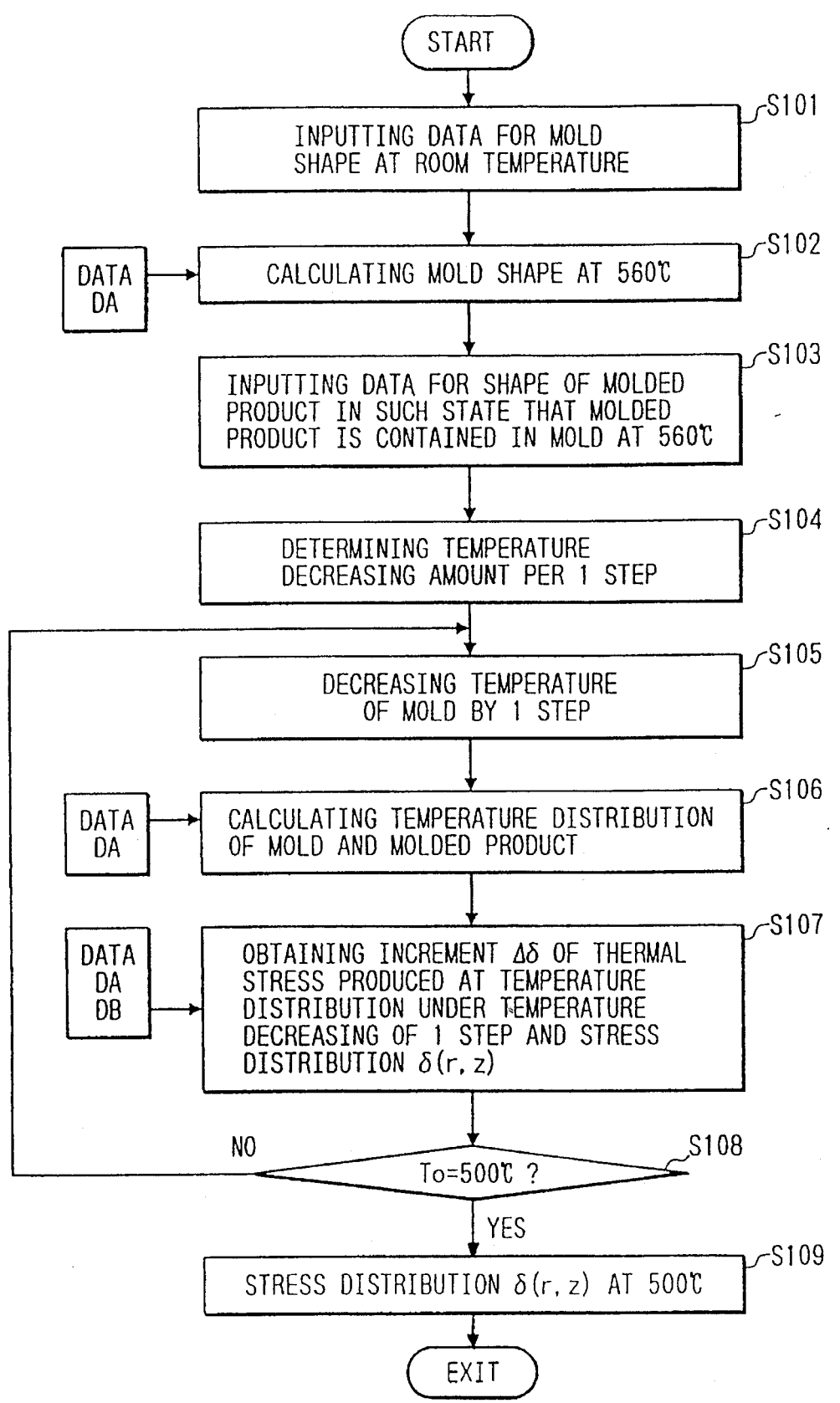
FIG. 47 is a flowchart showing in detail a part of the process.
Figure 48:
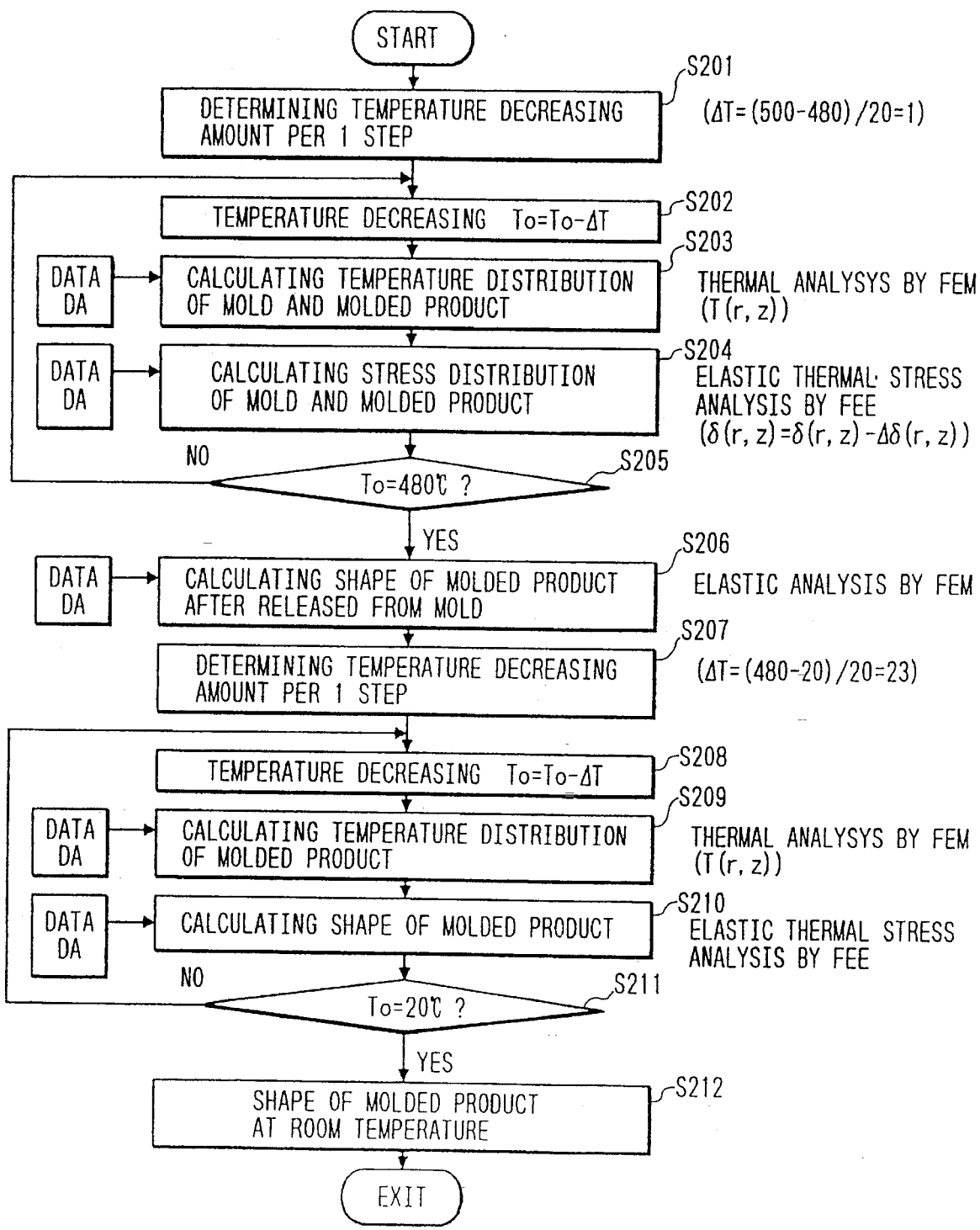
FIG. 48 is a flowchart showing in detail a part of the process.

A specific detailed flow chart for the step S52 is shown in FIGS. 47 and 48. That is, at step S101 in FIG. 47, data concerning the shape of the mold member at room temperature is input, and the shape of mold member at 560° C. is calculated at step S102 (herein, deformation due to thermal expansion of the mold is obtained from the Young's modulus, Poisson's ratio, and thermal expansion coefficient of data DA by the elastic thermal stress analysis based on the finite element method). Then, at step S103, data for the shape of the molded product is input in such a state that a glass molded product is contained within the mold members at 560° C. (herein, the mold members and the glass molded product are unstressed).

At step S104, a temperature decreasing amount (1° C.) per 1 step is determined (temperature decreasing amount $\Delta T=(560-500)/60=1$). Next, at step S105, the temperature $T_o$ (control point) of the mold member is decreased by one step. That is, $T_o=T_o\Delta T$ is executed (the initial value is 560° C.). At step S106, temperature distribution of the mold member and the molded glass product when temperature decreases by one step, is calculated from the specific heat, the heat conductivity, the heat transfer rate and the cooling rate. (Herein, the thermal analysis is executed by the finite element method to calculate the temperature distribution $T_{(r,z)}$. The initial condition of the finite element method is that initial value $T_{(r,z)}=560°$ C.). At step S107, increment $\Delta\delta$ of thermal stress produced at temperature distribution under temperature decreasing of one step is obtained from the conditions concerning Young's modulus, Poisson's ratio, thermal expansion coefficient, visco-elastic characteristic (relaxation elastic modulus, shift factor) of data DA, DB, cooling rate, and pressing force during the cooling. The stress distribution $\sigma_{(r,z)}$ at this time is obtained. (Herein, the visco-elastic thermal stress analysis is made by the finite element method, to obtain $\Delta\sigma_{(r,z)}$ and to calculate the stress distribution by $\sigma_{(r,z)}=\sigma_{(r,z)}+\Delta\sigma_{(r,z)}$. The initial condition of the finite element method is that initial value $\sigma_{(r,z)}=0$). Note that r and z in the above expressions $T_{(r,z)}$ and $\sigma_{(r,z)}$ indicate the stress coordinate system in the radial direction of molded glass product and that in the pressing direction of mold member. At step S108, a determination is made whether or not $T_o=500°$ C. is reached, and the feedback to step S104 is continuously performed until this is reached. In this way, the stress distribution in the visco-elastic region from 560° C. to 500° C. is obtained for each temperature decreasing step. Finally, the value of stress distribution $\sigma_{(r,z)}$ at 500° C. can be obtained at step S109.

Subsequently, a flowchart as shown in FIG. 48 is executed. Herein, like previous steps S104 to S108, the stress distribution in the elastic region from 500° C. to 480° C. (mold releasing temperature) is obtained for each temperature decreasing step at steps S201 to S205. (This will be fully under stood by referring to the drawings, thus its detailed explanation of the flow is omitted.) At step S206, numerical calculation concerning the shape of the molded glass product after released from mold, is performed (in the practical molding, if released from mold at 480° C. the glass molded product is released from the constraint within the mold members, and under these conditions, the elastic analysis is conducted by the finite element method. That is, the molded product undergoes elastic deformation (spring back phenomenon) to such a shape that the potential energy of residual thermal stress is minimum, for which the calculation is performed.)

Like previous steps S104 to S108, the stress distribution in the elastic region from 480° C. (mold releasing temperature) to 20° C. (room temperature) is obtained for each temperature decreasing step at steps S207 to S211. (This can be fully understood by referring to the drawings, thus its detailed explanation is omitted.) As a result, the shape of an optical functional face of an molded product at room temperature can be correctly obtained by the above simulation (step S212).

When the molding face of a mold is formed using a corrected value by the numerical analysis as above shown, a Fizeau's laser interferometer is used to verify the situation of an optical functional face of optical element molded by the mold at steps S3 and S4. It is effective to verify visually an image such as a photograph of interference fringes.

Figure 49:
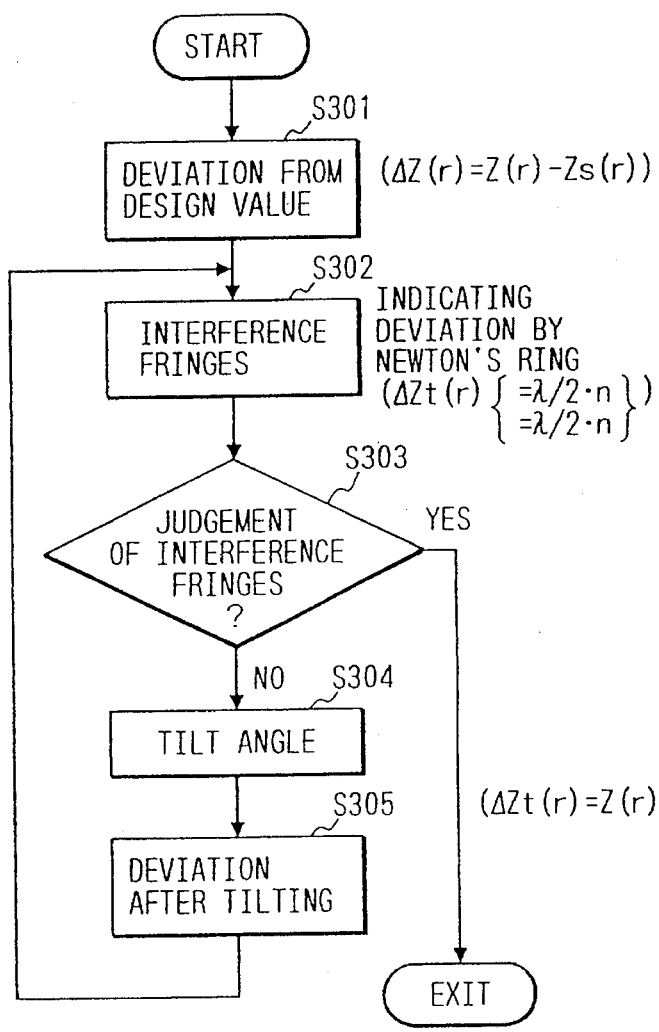
FIG. 49 is a flowchart showing in detail a part of the process.
Figure 50:
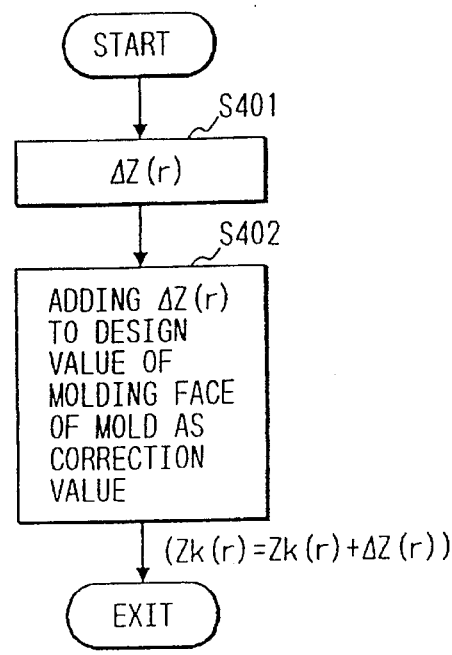
FIG. 50 is a flowchart showing in detail a part of the process.

FIGS. 49 and 50 show the specific processes at steps S53 and S54, respectively. In FIG. 49, at step S301, the shape of the optical functional face of molded glass product at room temperature obtained at step S212 as previously described (coordinate value $Z(r)$ obtained by thermal stress analysis in consideration of the visco-elasticity of glass) is compared with the design value $Z_s(r)$ initially provided to thereby obtain the deviation $\Delta Z(r)=Z(r)-Z_s(r)$. At step S302, the deviation is represented by interference fringes of Newton ring (i.e., in black when $\Delta Z(r)=(\lambda/2)n$, and in white when $\Delta Z(r)\neq(\lambda/2)n$. Herein, $\lambda=632.8$ nm). The results are judged as to whether or not the form of interference fringes is easy to see visually on the monitor. If the judgment is good, the operation exits from this routine, while if the judgment is bad, the form of interference fringes is changed by changing the tilt angle of the optical functional face on the design with respect to the optical functional face of the glass molded product at step S304. The deviation $\Delta Z_t(r)=Z(r)-Z_{ts}(r)$ from the design value in tilt state is calculated at step S305, and the operation returns to step S301 again. In this way, the contour map of the surface (deviation from the design value) of the glass molded product appears on the monitor in the form of interference fringes, whereby it is easy to determine whether or not the contour map of the surface is within the design tolerance.

Also, in FIG. 50, at step S401, the set value of the optical functional face of the molded glass product and the initial design value are compared to obtain the deviation $\Delta Z(r)$, which is added as a correction value to the initial design value of the molding face of the mold member (or the value of previously corrected value if correction is the second time or after) at step S402 ($Z_K(r)=Z_K(r)+\Delta Z(r)$). Thus, the ideal design value of the mold member can be obtained.

Figure 21:
FIG. 21 is a view of interference fringes showing the surface accuracy of a molded product by a mold with its shape uncorrected by numerical analysis in the above embodiment.

FIG. 21 illustrates a specific example of an optical functional face based on the numerical analysis as described above, with the mold uncorrected. An image as shown herein involves interference fringes when a He—Ne laser is used, one line of interference fringe corresponding to a deviation from a spherical surface as large as 0.3164 μm. This calculated result (improper by judgment) indicates that the optical element molded product has the contour map of the surface amounting to three lines of Newton ring (a deviation of about 1 μm from a desired spherical surface), wherein the optical element with such accuracy of an optical functional face can not be used for a high accuracy optical part such as a lens of a focal plane shutter camera (single lens reflex camera).

Figure 22:
FIG. 22 is a view of interference fringes showing the surface accuracy of a molded product practically molded by a mold with its shape uncorrected in the above embodiment.
Figure 23:
FIG. 23 is a view of interference fringes showing the surface accuracy of a molded product by a mold with its shape corrected by numerical analysis in the above embodiment.
Figure 24:
FIG. 24 is a view of interference fringes showing the surface accuracy of a molded product practically molded by a mold with its shape corrected in the above embodiment.

FIG. 22 illustrates interference fringes of a photographed optical functional face of an optical element molded using the mold, with a laser interferometer. It can be understood that the result is analogous to image interference fringes of FIG. 21, and has the contour map of the surface amounting to three lines of Newton ring. In other words, the shape of an optical functional face relying on the above numerical analysis is realistic, thus it indicates a high predictability for the practical optical functional face.

In this way, it has been confirmed that the above numerical analysis is applicable to correction for the molding face of mold on the basis of the fact that the shape of the optical functional face by numerical analysis is coincident with the shape of the practical optical functional face. Therefore, in the case of making a correction by such numerical analysis, the result of molding the optical functional face of optical element molded product using the mold is predicted as follows.

First, as the first time, the shape of the molding face of mold is corrected based on the numerical analysis as mentioned above. The correction amount at this time is indicated by the difference between the shape of an optical functional face of an molded product in using an uncorrected mold previously calculated and the ideal shape of a desired optical functional face. A mold thus corrected in the shape of a molding face is used, into consideration while the visco-elastic characteristic is taken into consideration as previous time, the thermal stress produced within the molded optical element product in the cooling step is numerically analyzed to obtain the shape of a optical functional face for the molded optical element product at room temperature. As a result, it has been found that the optical element molded by the mold corrected at the first time (primary) has a contour map of the surface amounting to one line of Newton ring.

Thus, at the second time, the shape of a molding face for the mold is corrected based on the numerical analysis performed on the optical functional face of an optical element product molded by corrected mold on the basis of the first time correction. That is, the correction amount at this time is indicated by the difference between the shape of the optical functional face of an optical element product molded by the corrected mold made at the first time correction and that of the ideal optical functional face. As a result of repeating such mold correction, the optical functional face of the optical element product molded by the mold corrected at the fourth time has a contour map of the surface as many as 0.1 line or less, whereby an excellent high accurate optical functional face can be indicated by calculation results as shown in FIG. 10.

The optical element molded by this corrected mold has a spherical optical functional face. The mold is corrected into aspherical shape, the maximum deviation (between spherical shape and aspherical shape) being about 0.8 μm.

According to the present invention, the molding face of the mold in practice can be finally determined in such a way that the optical functional face (virtual optical functional face) at room temperature of an optical element molded by the mold (virtual mold) having molding face (virtual molding face) corrected in accordance with the correction value obtained by the numerical analysis is calculated by computer simulation. The numerical analysis and the correction for the molding face based on this analysis are repeated over several order (one or more times) until the error between this virtual optical functional face and the set optical functional face falls within tolerance. As a result, it is possible to obtain the optical element having its optical functional face analogous precisely to a desired optical functional face and to produce such mold.

The determination of an molding face as described above may be made by repeating the numerical analysis of the thermal stress based on the visco-elastic characteristic of an optical element molded product within the mold and the correction for the molding face of an practical mold based on this analysis over several order.

In this embodiment, the verification is made supposing that there is no difference between the temperature of the mold being cooled and that of the inside of the optical element molded product. In practice, in order to prevent the molded product from adhering to the molding face of an upper mold member and leaving away from the molding face of an lower mold member upon releasing from mold, the temperature control is provided with a slight temperature difference of the upper and lower mold members. Thus, if the molding is conducted by providing such a temperature difference of the upper and lower mold members of the mold in this way, general verification will be performed as follows.

Figure 26:
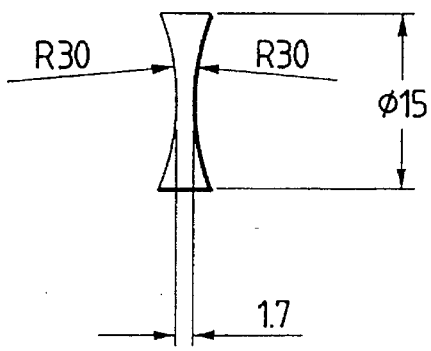
FIG. 26 is a side view of an optical element molded product in another embodiment.
Figure 27:
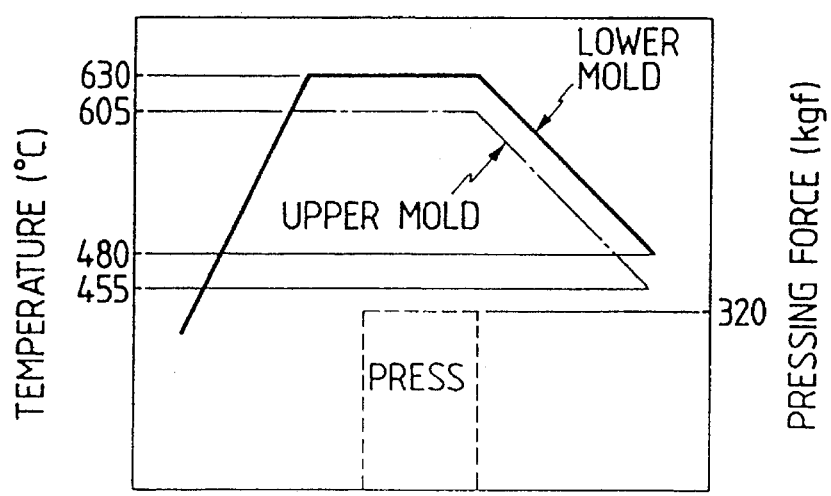
FIG. 27 is a graphic representation for explaining a molding process in the above embodiment.

The shape of an optical element provided herein is concave on both faces, as shown in FIG. 26, wherein the diameter is 15 mmφ, the central wall thickness is 1.7 mm, and the radius of curvature on the optical functional face is R=30 mm (both faces). The material of an optical element and the quality of mold material are the same as in the previous embodiment. The blank as the molding material is premolded into a shape (diameter: 15 mmφ, central wall thickness: 1.8 mm, radius of curvature on the optical functional face: R=31 mm) approximate to the shape of the optical element. This blank is first loaded between the upper and lower mold members, and the upper mold member and the lower mold member are heated to 605° C. and 630° C., respectively, and is pressurized continuously until the central wall thickness of a molded product reaches 1.7 mm. In this way, pressurization is finished after molding the optical element. Then the cooling step is entered. In this cooling step, a temperature difference of 25° C. is held between the upper and lower mold members. Finally, when the temperature of the upper mold member reaches 455° C. and the temperature of the lower mold member reaches 480° C., the molded product is released from the mold, taken out therefrom, and cooled down to room temperature. The cooling rate is 20° C. per minute for both the upper and lower mold members.

The shape of the optical functional face of optical element provided in such a molding process can be obtained as the above-described embodiment by the numerical analysis in consideration of the visco-elastic characteristic of the material of optical element. There is a need of the numerical analysis in consideration of the internal temperature distribution of the molded product.

Figure 28:
FIG. 28 is a view of interference fringes showing the surface accuracy of the upper optical functional face of a molded product by a mold with its shape uncorrected by numerical analysis in the above embodiment.
Figure 29:
FIG. 29 is a view of interference fringes showing the surface accuracy of the lower optical functional face of the molded product by the mold with its shape uncorrected by numerical analysis in the above embodiment.

First, where an optical element is molded using a mold with an uncorrected shape of an optical functional face obtained by the calculation at this time (by computer simulation), the shape (image) of the optical functional face on the upper side is shown in FIG. 28, and the shape (image) of the optical functional face on the lower side is shown in FIG. 29. The upper and lower molding faces of the mold have the same radius of curvature, but owing to a constant temperature difference of the upper and lower molding faces in the cooling step, each of the upper and lower optical functional faces of the optical element contains a difference, the contour map of the surface amounting to three lines of Newton ring missing for the upper face, and five lines of Newton ring ridging for the lower face. As the evaluation, it is impossible to utilize an optical element having such contour map of the surface for the high precision optical device.

Figure 30:
FIG. 30 is a view of interference fringes showing the surface accuracy of the upper optical functional face of a molded product practically molded by the mold with its shape uncorrected in the above embodiment.
Figure 31:
FIG. 31 is a view of interference fringes showing the surface accuracy of the lower optical functional face of the molded product practically molded by the mold with its shape uncorrected in the above embodiment.

On the other hand, interference fringes appearing on the optical element examined at this time which is molded in practice using a mold with the shape of a molding face corresponding to the optical functional face uncorrected, are illustrated in FIG. 30 (upper mold) and FIG. 31 (lower mode). It has been found that the results have the same contour map of the surface as the above-described image. That is, it has been confirmed that supposing a certain temperature distribution having a temperature gradient within the molding material, the shape of the optical element can be predicted precisely.

Figure 32:
FIG. 32 is a view of interference fringes showing the surface accuracy of the upper optical functional face of a molded product with its shape corrected by numerical analysis in the above embodiment.
Figure 33:
FIG. 33 is a view of interference fringes showing the surface accuracy of the lower optical functional face of the molded product by the mold with its shape corrected by numerical analysis in the above embodiment.

In this embodiment, it has been found by simulation that the results of calculating the shape of an optical functional face of an optical element molded by the mold corrected at the fifth order have interference fringes as illustrated in FIG. 32 (upper mold) and FIG. 33 (lower mold). The contour map of the surface for this optical element molded product has 0.2 line or less of Newton ring, and an excellent high accuracy optical functional face can be obtained.

Figure 34:
FIG. 34 is a view of interference fringes showing the surface accuracy of the upper optical functional face of a molded product practically molded by a mold with its shape corrected in the above embodiment.
Figure 35:
FIG. 35 is a view of interference fringes showing the surface accuracy of the lower optical functional face of the molded product practically molded by the mold with its shape corrected in the above embodiment.

On the other hand, it has been found by simulation that the results of measuring the shape of an optical functional face of an optical element molded by the mold corrected at the fifth order have interference fringes as illustrated in FIG. 34 (upper mold) and FIG. 35 (lower mold). The contour map of the surface for the molded product is 0.2 line or less of Newton ring, and the excellent high accuracy optical functional face can be obtained. The optical element molded by the mold corrected at this time has a spherical optical functional face, with the mold being corrected into an aspherical shape. The maximum deviation (between spherical and aspherical shapes) is about 1 μm for the upper mold and about 2 μm for the lower mold.

Figure 36:
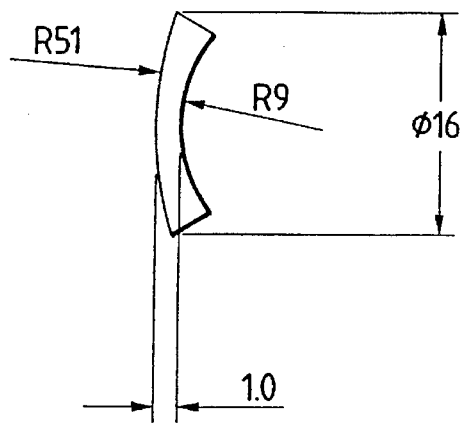
FIG. 36 is a side view of an optical element molded product in another embodiment.
Figure 37:
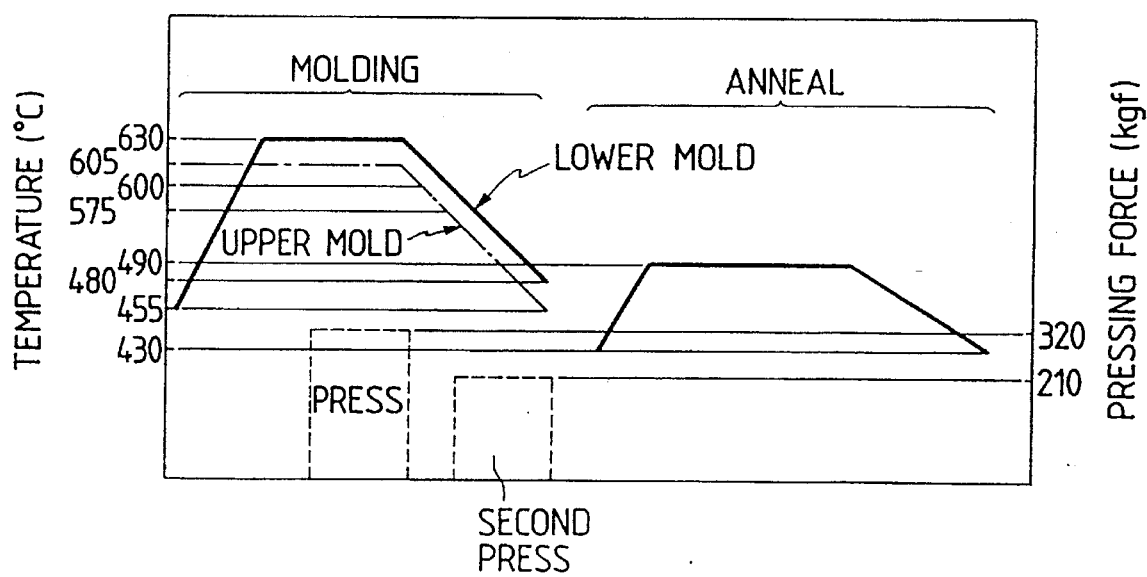
FIG. 37 is a graphic representation for explaining a molding process in the above embodiment.

Next, the production of an aspherical lens having a high precision optical functional face which may be required in cameras or video cameras, using the mold of the present invention, will be described below. A concave meniscus lens aspherical on both faces as shown in FIG. 36 will be examined. The lens specifications on design are such as the diameter: 16 mmφ, the central wall thickness: 1.0 mm, R=51 mm, the maximum deviation: 12 μm, aspherical for the convex face, and R=9 mm, the maximum deviation: 8 μm, aspherical for the concave face. The material of the optical element is the same as in the first embodiment, and particularly in this embodiment, the optical element material is coated with a CH film on the surface thereof to make better the separation between mold and molded product. Also, the mold is coated with a TiN film to improve the durability of the molding face, although the mold material is the same as previously described. For the optical element material, the blank is premolded into a shape (a concave meniscus shape with a diameter of 16 mmφ, R=48 mm and R=10 mm) approximate to the shape of optical element.

This optical element material is put into a prepared mold, press molded with a predetermined temperature difference of the upper and lower mold members, and then cooled, as in the previous embodiment. When the molded product is released from the mold at a higher temperature than the glass transition point temperature, the glass will be deformed due to viscosity, making worse the shape of optical functional face, against which a second pressing force of 210 kgf is applied to the molded product while the lower mold member is cooled from 600° C. to 480° C. When the upper mold member reaches 455° C. and the lower mold member reaches 480° C., the molded product is taken out of the mold, and cooled down to room teperature. The cooling rate in this cooling step is 20° C. per minute.

The optical element produced under such molding conditions has internal residual stress, leaving behind optical strain and causing the birefringence. Also, because the optical material is heated above the glass transition point temperature and is cooled at a rate of 20° C./min., its refractive index will change. Accordingly, in order to use the molded product as the high precision optical part, it is necessary that the molded product is subjected to optical anneal for purposes of the removal of optical strain and the adjustment of refractive index. In this embodiment, under the temperature condition of 49° C., the annealing was performed for seventeen hours, while the temperature dropped at a rate of 5° C./hour, so that the molded product was cooled down to 430° C.

The shape of the optical element product molded under such molding and annealing conditions is obtained by numerical analysis, as in the above embodiment. Since the annealing temperature is within a visco-elastic temperature range of the molded product material, the residual stress arising in that range will be relaxed.

Thus, in this embodiment, the shape of an optical functional face in the cooling step to room temperature after the annealing will be calculated in consideration of the relaxation of residual stress during the annealing.

First, it is supposed that an optical element product is molded using the mold with an uncorrected shape of an optical functional face obtained by this calculation.

Figure 38:
FIG. 38 is a view of interference fringes showing the surface accuracy of the upper optical functional face of a molded product by a mold with its shape uncorrected by numerical analysis in the above embodiment.
Figure 39:
FIG. 39 is a view of interference fringes showing the surface accuracy of the lower optical functional face of the molded product with its shape uncorrected by numerical analysis in the above embodiment.
Figure 40:
FIG. 40 is a view of interference fringes showing the surface accuracy of the upper optical functional face of a molded product practically molded with its shape uncorrected in the above embodiment.
Figure 41:
FIG. 41 is a view of interference fringes showing the surface accuracy of the lower optical functional face of the molded product practically molded by the mold with its shape uncorrected in the above embodiment.

Under the condition that the optical element product is subjected to an annealing process, the upper and lower optical functional faces at room temperature are illustrated in FIG. 38 (upper face) and FIG. 39 (lower face), respectively. The results molded by the mold in practice under these conditions are illustrated in FIGS. 40 and 41, respectively. A comparison between the result of computer simulation and the practical result has revealed that the shape of the optical functional face after optical annealing can be predicted at good precision. From this result, it can be predicted that by making correction for the molding face of the mold over several order, as the previous embodiment, the optical functional face of optical element product molded by this corrected mold has high accuracy.

Figure 42:
FIG. 42 is a view of interference fringes showing the surface accuracy of the upper optical functional face of a molded product with its shape corrected by numerical analysis in the above embodiment.
Figure 43:
FIG. 43 is a view of interference fringes showing the surface accuracy of the lower optical functional face of the molded product with its shape corrected by numerical analysis in the above embodiment.
Figure 44:
FIG. 44 is a view of interference fringes showing the surface accuracy of the upper optical functional face of a molded product practically molded by a mold with its shape corrected in the above embodiment.
Figure 45:
FIG. 45 is a view of interference fringes showing the surface accuracy of the lower optical functional face of the molded product practically molded by the mold with its shape corrected in the above embodiment.

In this embodiment, as a result of molding the optical element by the mold corrected at the fifth order, the optical functional face has interference fringes as illustrated in FIG. 42 (upper face) and FIG. 43 (lower face). The contour map of the surface for the molded product is 0.2 line or less of Newton ring, resulting in excellent high accuracy of optical functional face being exhibited. In practice, interference fringes of optical functional face of optical element product molded by the mold corrected at the fifth order are illustrated in FIG. 44 (upper face) and FIG. 45 (lower face). In this case, the contour map of the surface for the molded product is 0.2 line or less of Newton ring, resulting in excellent high accuracy of optical functional face being exhibited.

From the above description, it can be concluded that in molding a lens concave on both faces, as in this embodiment, even if optical annealing may be conducted after molding wherein a second pressing force is applied to the molded product in the cooling step in order to prevent the molded product from being released from a mold at high temperatures, there is no trouble in the correction for the optical functional face according to the present invention.

According to the present invention as above detailed, by premolding an optical element using a mold with the shape of molding face corresponding to that of a an optical functional face corrected, it is possible to produce with high accuracy a lens having the shape of which the optical functional face is conventionally difficult to transfer at desired precision by the molding, for example, an aspherical concave lens, whereby the production costs can be reduced.

What is claimed is:

1. An optical element formed from an optical element material press-molded in a mold, with thermal stress produced on said optical element material molded within said mold at a visco-elastic temperature range and an elastic temperature range of said optical element material in a cooling step of a molding process to be performed, then being numerically analyzed on the basis of a visco-elastic characteristic of said optical element material, a molding face of said mold is corrected on the basis of the value obtained by the numerical analysis so that an error between an optical functional face of the molded optical element analyzed at room temperature and a design optical functional face falls within a tolerance, thereby determining the molding face adapted to a shape of the design optical functional face, wherein the optical element is remolded in accordance with a molding process using the mold to have such a corrected molding face.

\* \* \* \* \*

UNITED STATES PATENT AND TRADEMARK OFFICE
CERTIFICATE OF CORRECTION

PATENT NO. : 5,604,549  Page 1 of 2
DATED : February 18, 1997
INVENTOR(S) : Mashige et al.

It is certified that error appears in the above-identified patent and that said Letters Patent is hereby corrected as shown below:

COLUMN 3:

Line 2, "can-not" should read --cannot--.

COLUMN 9:

Line 10, "0°X2.5°C." should read --0°±2.5° C.--

COLUMN 13:

Line 19, "is" should be deleted, and "of" (second occurrence) should read --is--.

COLUMN 14:

Line 3, "glass" should read --glass as--.

UNITED STATES PATENT AND TRADEMARK OFFICE
CERTIFICATE OF CORRECTION

PATENT NO. : 5,604,549  Page 2 of 2
DATED : February 18, 1997
INVENTOR(S) : Mashige et al.

It is certified that error appears in the above-identified patent and that said Letters Patent is hereby corrected as shown below:

COLUMN 19

Line 25, "order." should read --orders.--.

Signed and Sealed this

Twenty-fifth Day of November, 1997

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,604,549
DATED : February 18, 1997
INVENTOR(S) : Mashige, et. al.

It is certified that error appears in the above-identified patent and that said Letters Patent is hereby corrected as shown below:

Title page, item [56]  REFERENCES CITED:

Insert --FOREIGN PATENT DOCUMENTS
                61-32263   7/1986   Japan
                61-21925   1/1986   Japan--.

Signed and Sealed this

Sixteenth Day of December, 1997

Attest:

BRUCE LEHMAN

Attesting Officer        Commissioner of Patents and Trademarks